US006340994B1

(12) United States Patent
Margulis et al.

(10) Patent No.: US 6,340,994 B1
(45) Date of Patent: Jan. 22, 2002

(54) SYSTEM AND METHOD FOR USING TEMPORAL GAMMA AND REVERSE SUPER-RESOLUTION TO PROCESS IMAGES FOR USE IN DIGITAL DISPLAY SYSTEMS

(75) Inventors: Neal Margulis, Woodside, CA (US); Chad Fogg, Seattle, WA (US)

(73) Assignee: Pixonics, LLC, Palo Alto, CA (US)

( * ) Notice: Subject to any disclaimer, the term of this patent is extended or adjusted under 35 U.S.C. 154(b) by 0 days.

(21) Appl. No.: 09/277,100

(22) Filed: Mar. 26, 1999

Related U.S. Application Data

(60) Provisional application No. 60/096,322, filed on Aug. 12, 1998.

(51) Int. Cl.[7] .............................. H04N 5/21; H04N 9/64
(52) U.S. Cl. ....................... 348/625; 348/630; 348/675; 348/721
(58) Field of Search ................................. 348/625, 630, 348/571, 607, 606, 620, 708, 718, 719, 720, 721, 674, 675; H04N 5/21, 5/14, 9/64

(56) References Cited

U.S. PATENT DOCUMENTS

| 4,843,380 A | 6/1989 | Oakley et al. |
|---|---|---|
| 5,092,671 A | 3/1992 | Vans Os |
| 5,369,432 A | 11/1994 | Kennedy |
| 5,426,471 A | 6/1995 | Tanaka et al. |
| 5,515,111 A | 5/1996 | Guedalia |
| 5,543,819 A | 8/1996 | Farwell et al. |
| 5,559,676 A | 9/1996 | Gessaman |
| 5,579,027 A | 11/1996 | Sakurai et al. |
| 5,633,956 A | 5/1997 | Burl |
| 5,666,164 A | 9/1997 | Kondo et al. |
| 5,668,569 A | 9/1997 | Greene et al. |
| 5,696,848 A | 12/1997 | Patti et al. |
| 5,754,260 A | 5/1998 | Ooi et al. |

OTHER PUBLICATIONS

Foley, Van Dam, Feiner, Hughes: Computer Graphics Principals and Practice; 1990; pp. 155–165, 564–567, 822–834; Addison Wesley.

Patrick Candry: Projection Systems; Display Systems; 1997; pp. 237–256; John Wiley and Sons.

(List continued on next page.)

Primary Examiner—Sherrie Hsia
(74) Attorney, Agent, or Firm—Wells, St. John, Roberts, Gregory & Matkin

(57) ABSTRACT

An image processing system including a display output processor using Temporal Gamma Processing (TGP) and Reverse Super-resolution (RSR) techniques to process images. TGP assures that the time-related representation of an image is as accurate as possible, and thus, based on a previous frame value and a known transfer function of the display modulation system, adjusts its output values to provide a desired output value during display of a desired frame. RSR performs a superset of the frame rate conversion process for converting between disparate input and output frame rates. RSR, improving display quality when intended display images have apparent resolution higher than can be supported by an image modulator, sequences lower resolution images at higher frame rates to simulate higher resolution outputs. RSR also spatially filters the lower resolution images into transitional images by shifting the pixel matrix of each image frame such that the weighted filter center of each sequenced frame is constant or such that motion artifacts are not generated. Additionally, RSR, to prevent motion artifacts, enables moving the viewed images at the display refresh screen rate and uses motion-adaptive filters and motion tracking information to track image objects.

32 Claims, 11 Drawing Sheets

OTHER PUBLICATIONS

Charles McLaughlin, Dave Armitage: Prospects for Microdisplay Based Rear Projection; 1996.

Snell & Wilcox: Kudos NRS500 Online Product Guide; pp. 1–2.

Snell & Wilcox: Kudoes NRS30 Online Product Guide; pp. 1–2.

Pixelworks: PW364 Image Processor Data Sheet; www.pixelworksinc.com/products/364datasheet. html.

Faroudja Labs: VP401 On Line Product OVerview; Jul. 28, 1998.

Faroudja Labs: VS50 On Line Product OVerview; Jul. 28, 1998.

Darim: M–Filter Product OVerview; 1997; pp. 1–3.

D. W. Parker: The Dynamic Performance of CRT and LC Displays; Getting the Best from State–of–the–Art Display Systems; Feb. 21–23, 1995; London, UK; Society for Information Display.

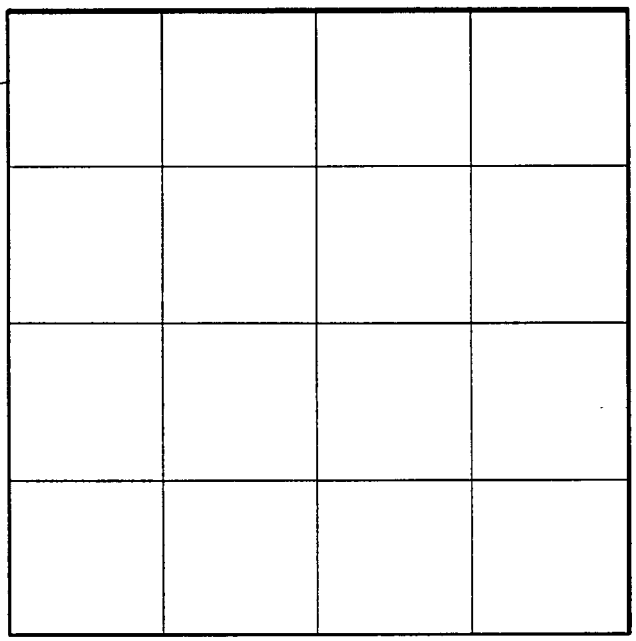
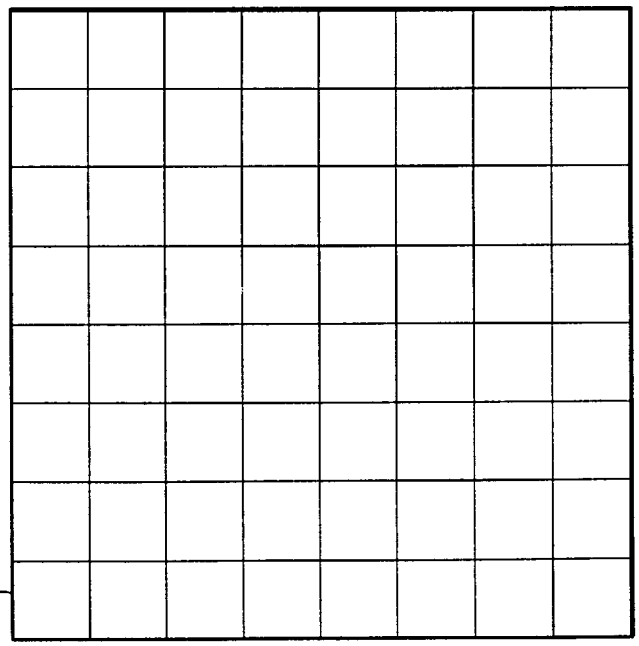
FIG. 8B

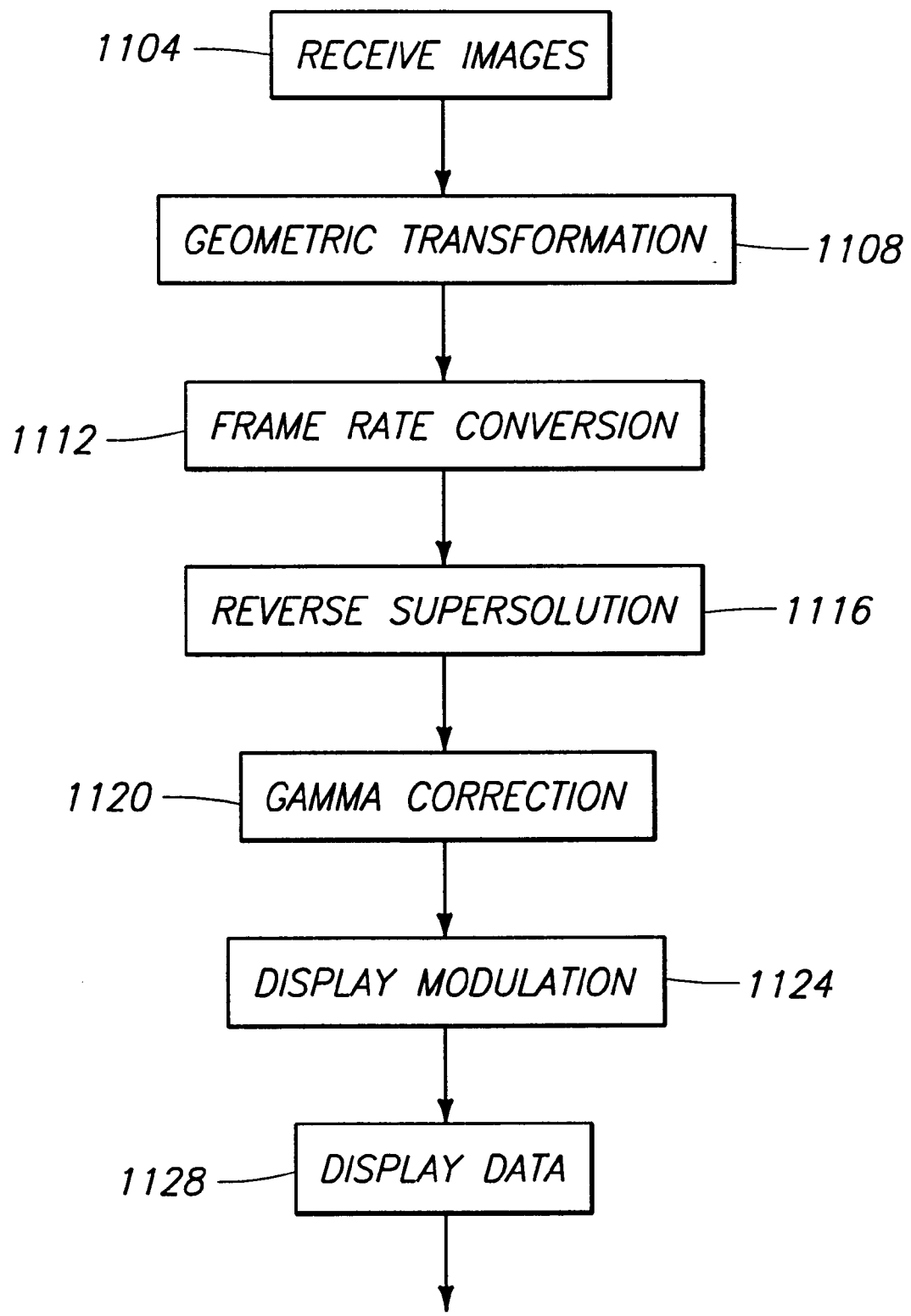

SYSTEM AND METHOD FOR USING TEMPORAL GAMMA AND REVERSE SUPER-RESOLUTION TO PROCESS IMAGES FOR USE IN DIGITAL DISPLAY SYSTEMS

This application claims the benefit of U.S. Provisional Application Ser. No. 60/096,322 filed on Aug. 12, 1998, and is related to co-pending U.S. patent application Ser. No. 09/250,424, entitled "System and Method for Using Bitstream Information to Process Images for Use in Digital Display Systems," filed on Feb. 16, 1999, which is hereby incorporated by reference.

BACKGROUND OF THE INVENTION

1. Field of the Invention

The present invention relates generally to digital image display systems and more particularly to using temporal gamma and reverse super-resolution techniques to process images for optimizing appearance quality.

2. Discussion of Prior Art

Cathode Ray Tubes (CRTs), used in conventional televisions and computer monitors, are analog devices which scan an electron beam across a phosphor screen to produce an image. Digital image processing products that enhance display graphics and video on CRTs have been increasingly available because CRTs can work with many different input and output data formats. Further, CRTs can display moving images with high quality screen brightness and response. However, CRTs have considerable limitations in applications such as portable flat screen displays where size and power are important. Additionally, as direct view CRT display size increases, achieving high quality completely across the display becomes more difficult and expensive.

Many recent portable and desktop systems include digital displays using liquid crystal displays (LCDs), a term which generally describes flat-panel display technologies and in particular active matrix liquid crystal displays (AMLCDs), silicon reflective LCDs (si-RLCDs), ferroelectric displays (FLCs), field emission displays (FEDs), electroluminescent displays (ELDs), plasma displays (PDs), and digital mirror displays (DMDs).

Compared to traditional CRT displays LCDs have the advantages of being smaller and lighter, consuming less power, and having discrete display elements, which can provide consistent images across the entire display. However, manufacturing LCDs requires special processing steps to achieve acceptable visual quality. Further, large screen direct view LCDs are expensive, and LCDs usually require a display memory.

Both CRT and LCD technologies can provide economical projection system large screen displays. CRT-based projection systems usually require three CRTs and three projection tubes, one for each of the Red (R), Green (G), and Blue (B) color components. Each tube must produce the full resolution display output at an acceptable brightness level, which makes the tubes expensive. Achieving proper tolerances for mechanical components in projection systems, including alignment hardware and lenses, is also expensive. Consequently, manufacturing CRT-based projection systems is costly. Since CRTs are analog, applying digital image processing techniques to CRT-based systems usually requires a frame buffer memory to effectively represent the digital image data.

Projection display systems also use transmissive or reflective LCD "microdisplay" technologies. Achieving the desired full color gamut in LCD-based parallel color projection systems, as in CRT-based projection systems, uses three separate LCD image modulators, one for each of the R, G, and B color components. A single LCD image modulator which produces R, G, and B either through spatial color filters or with sequential color fields at a sufficiently high rate can provide a low cost system.

FIG. 1 shows a prior art projection system 150 that includes a light system 100, mirrors 102, 104, 106, and 108, transmissive image modulators 110, 112, and 114, dichroic recombiners 116 and 118, and a projection lens 120. Light system 100 includes an illumination source such as a xenon lamp and a reflector system (not shown) for focusing light.

Mirrors 102, 104, 106, and 108, together with other components (not shown) constitute a separation subsystem that separates the light system 100 output white light beam into color components Red (R), Green (G), and Blue (B). The separation subsystem can also use prisms, including x-cube dichroic prism pairs or polarizing beam splitters.

Each image modulator 110, 112, and 114 receives a corresponding separated R, G, or B color component and functions as an active, full resolution, monochrome light valve that, according to the desired output images, modulates light intensities for the respective R, G, or B color component. Each image modulator 110, 112, and 114 can include a buffer memory and associated digital processing unit (not shown). A projection system may use only one image modulator which is responsible for all three color components, but the three image modulator system 150 provides better chromaticity and is more efficient.

Dichroic recombiners 116 and 118 combine modulated R, G, and B color components to provide color images to projection lens 120, which focuses and projects images onto a screen (not shown).

FIG. 1 system 150 can use transmissive light valve technology which passes light on axis 1002 through an LCD shutter matrix (not shown). Alternatively, system 150 can use reflective light valve technology (referred to as reflective displays) which reflects light off of digital display mirror display (DMD) image modulators 110, 112, and 114. Because each image modulator 110, 112, and 114 functions as an active, full resolution, monochrome light valve that modulates the corresponding color component, system 150 requires significant buffer memory and digital image processing capability.

Because of inherent differences in the physical responses of CRT and LCD materials, LCD-based projection and direct view display systems both have different flicker characteristics and exhibit different motion artifacts than CRT-based display systems. Additionally, an intense short pulse depends on the properties of CRT phosphors to excite a CRT pixel whereas a constant external light source is intensity modulated during the frame period of an LCD display. Further, LCDs switch in the finite time it takes to change the state of a pixel. Active matrix thin film transistor (TFT) displays, which have an active transistor controlling each display pixel, still require a switching time related to the LCD material composition and thickness, and the techniques of switching.

Most LCD-based image modulators (110, 112, 114, etc.) are addressed in raster scan fashion and require refreshing each pixel during each display frame interval. Accordingly, every output pixel is written to the display during every refresh cycle regardless of whether the value of the pixel has changed since the last cycle. In contrast, active matrix display technologies and some plasma display panel technologies allow random access to the display pixels. Other, simpler panels use a simpler row by row addressing scheme similar to the raster scan of a CRT. Additionally, some displays have internal storage to enable output frames to self-refresh based on residual data from the previous output frame.

Field Emission Displays (FEDs) may include thousands of microtips grouped in several tens of mesh cells for each pixel. The field emission cathodes in FEDs can directly address sets of row or column electrodes in FEDs, and FEDs have fast response times. FEDs can use external mesh addressing for better resolution images, but this requires increased input/output (I/O) bandwidth outside of the FED.

Opto-mechanical systems can provide uniform brightness and high chromaticity for high quality displays. Additionally, high quality projection lens systems can provide bright and uniform images. However, component and assembly tolerances in opto-mechanical systems can result in system imperfections including imprecise image modulator alignment and geometric lens distortion.

Commercially available digital image processing systems, usually a part of an electronic control subsystem, can process analog or digital input data and format the data into higher resolution output modes. These processing systems typically perform operations such as de-interlacing, format conversion and line doubling or quadrupling for interlaced analog input data. Some systems include a decompression engine for decompressing compressed digital data, and input data scaling to match the resolution and aspect ratio to the display device. However, these systems do not perform advanced image processing specific to a digital imaging LCD or to the display system. Additionally, these digital image processing systems do not often accommodate digital or compressed digital image data which can include bitstream information for enhanced outputs.

Image sensing algorithms, for example in remote sensing and computer vision applications, use special sampling and image warping techniques to correct input sensor distortions and to reconstruct images.

Data compression tools such as those standardized by the Moving Pictures Experts Group (MPEG) can compact video data prior to transmission and reconstruct it upon reception. MPEG-2 can be applied to both standard definition (SDTV) and high definition television (HDTV).

Projecting an image from a projector on a tabletop to a flat screen which is closer to the projector at the bottom than the top results in an image which is narrower at the bottom than at the top in what is known as the "Keystone" effect.

Radial distortion occurs when an image pixel is displaced from its ideal position along a radial axis of the image. Because an image has the largest field angles in the display corners, the corners exhibit worse radial distortion than other display areas. Radial distortion includes barrel distortion, where image magnification decreases towards the corners, and pin cushion distortion, where the magnification increases towards the corners. Lens related distortions including radial distortion can cause image deformation. Distortion can also result from non-flat screens or earth's magnetic field.

Image modulators (110, 112, 114, etc.) have a fixed number of pixels spaced uniformly in a pattern. Projecting an image from an image modulator to a display screen deforms the uniformity of pixel spacing, that is, pixels are not correlated one to one from the image modulator to the display screen. Therefore, some screen display regions have more image modulator pixels than screen pixels while other screen display regions have fewer image modulator pixels than screen pixels.

Motion artifacts appear where image objects move near the edges of curved screens. Even when a flat screen projection is motion-adaptive filtered, the difference in the distances of objects from the projector causes an apparent motion of moving objects on a curved screen. Additionally, extremely large curved screens can achieve necessary resolution and brightness only with film projectors.

Multiple camera systems are commonly used to improve display quality on curved screen displays. For example, two cameras record respective halves of a scene to improve output. A layered coding technique may include a standard MPEG-2 stream as a base layer and enhancement information as a supplemental layer. Even if the two views are from slightly different angles, the compression ratio for the two camera views combined is less than the total compression ratio would be if each view were captured and compressed independently. Additionally, the second camera can provide a view that may be occluded from the first camera. Systems using additional camera angles for different views can provide additional coded and compressed data for later use. Multiple camera systems can also compensate for the limited focal depth of a single camera and can substitute for the use of a depth finding sensor which senses and records depth information for scenes. Image processing can improve the outputs of multiple camera systems.

Stereoscopic photography also uses multi-camera systems in which a first camera records a left eye view and a second camera records a right eye view. Because camera lenses focus at a certain distance, one camera uses one focal plane for all objects in a scene. A multi-camera system can use multiple cameras each to capture a different focal plane of a single scene. This effectively increases the focal depth. Digital image processing can further improve focusing for these multi-camera systems.

Types of three dimensional binocular display systems include anaglyph displays, frame sequence displays, autostereoscopic displays, single and multi-turn helix displays. These normally have multiple camera data channels. Anaglyph systems usually require a user to wear red and green glasses so that each eye perceives a different view. Frame sequencing systems use shutter glasses to separate left and right views. Autostrereoscopic displays use lenticular lenses and holographic optical elements. Single or multi-turn helix displays use multiple semi-transparent display screens which can be seen by multiple observers without special glasses. Multiple camera data channels systems can benefit from image processing.

Each R, G, and B color component has different intensity values which are digitally represented by a number of bits. For example, if 8 bits represent each R, G, and B color component then each component has 256 ($=2^8$) intensity values from 0 to 255. Changing intensity value of a color component in an ideal digital device from a number X, for example, to a number Y, takes just as long whatever the Y value. Consequently, changing a color component value from 2 to 3 takes as long as changing the value from 2 to 200. However, because of the nature of LCD image modulator pixels, the transitions for modulating light intensities are not purely digital, and various analog distortions remain.

What is needed is an image processing system to enhance display quality and provide the best possible visual images.

SUMMARY OF THE INVENTION

The present invention is directed to an image processing system for enhancing visual quality and improving performance in digital display systems. The processing system, useful for DTV displays and electronic theaters, can receive different types of data inputs including analog, digital, and compressed (or coded) display images. When lower resolution input images are used, the images are converted into higher quality display images using multiframe restoration. The processing system uses known information to provide unique enhancements to the image modulator and to the display system, and thus takes into account system characterization, manufacturing defects, calibration data, environment effects, and user controlled setup information. The processing system also employs Temporal Gamma Processing (TGP) and Reverse Super-Resolution (RSR) techniques to process images.

TGP independently processes each R, G, or B color component and compensates for modulating transition characteristics to assure that the time related representation of an image is as accurate as possible. TGP uses a previous frame value and a known transfer function of the display modulating system to adjust TGP outputs to desired values. TGP can overdrive an LCD image modulator to compensate for the LCD material characteristics so that the desired output value can be quickly achieved.

RSR performs a superset of the frame rate conversion process for converting disparate input and output frame rates. RSR improves display quality when intended display images have a higher apparent resolution than can be supported by the number of pixels of the image modulator. RSR, block by block, spatially filters one frame in a video sequence having a higher resolution into numerous frames having a higher frame rate and a lower resolution than the original frame. RSR, while sequencing the higher frame rate and lower resolution frames, shifts the pixel matrix of each sequenced frame and uses motion tracking to filter the images and to prevent motion artifacts. RSR can also be used with a moveable image modulator that shifts the pixel matrix by a sub-pixel distance during each sequenced frame refresh, that is, during each high resolution image the frame is sequenced into lower resolution frames and the frames are displayed during the cycle of frame refreshes.

BRIEF DESCRIPTION OF THE DRAWINGS

FIG. 8 shows an image having an 8×8 pixel resolution and a display having a 4×4 pixel resolution;

FIG. 11 is a flowchart illustrating DOP 230's image processing.

DETAILED DESCRIPTION OF THE PREFERRED EMBODIMENTS

The present invention provides an image processing system which digitally processes one or more input data for output to a digital image modulator or to a digital memory from which a display device retrieves data.

Figure 1:
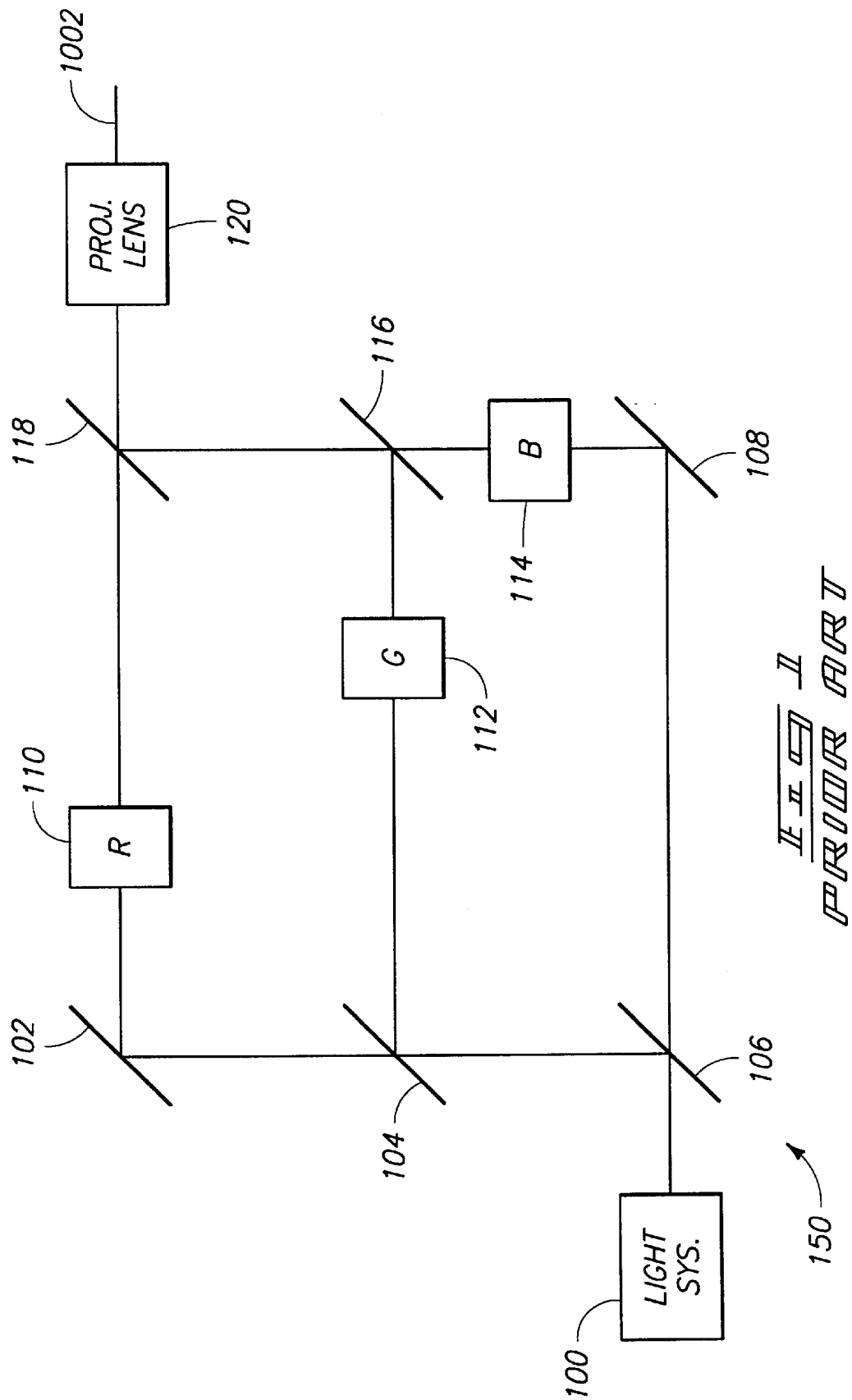
FIG. 1 is a block diagram of a prior art projection display system using three transmissive LCD imaging elements.
Figure 2:
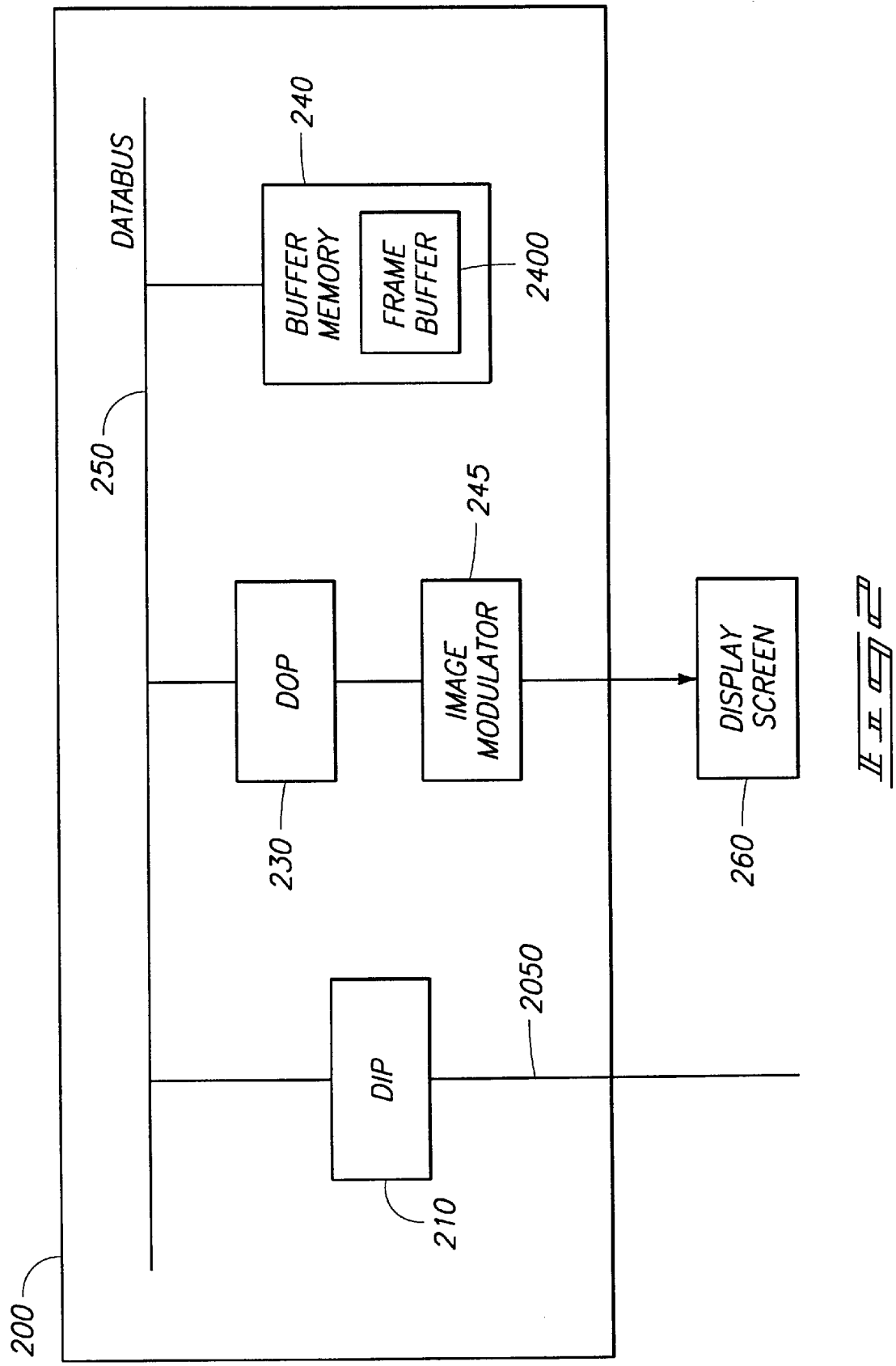
FIG. 2 is a block diagram of an image processing system in accordance with the invention.

FIG. 2 shows an image processing system 200 which includes a Display Input Processor (DIP) 210, a Display Output Processor (DOP) 230, and a buffer memory 240, all coupled to a databus 250. System 200 also includes an image modulator 245 (comparable to FIG. 1 modulators 110, 112, and 114) coupled to DOP 230 and to an external display screen 260. DIP 210 preferably receives images on line 2050 and reconstructs the images both spatially and temporally. DIP 210 outputs are processed by DOP 230 to enhance image visual quality. DOP 230 outputs, preferably in frame format, are stored in frame buffer 2400 which is part of buffer memory 240. Buffer memory 240 stores data for use by DIP 210 and DOP 230. Frame buffer 2400, which stores image data for outputting to image modulator 245 or to a digital memory (not shown), is preferably part of buffer memory 240, but alternatively can be part of the digital memory, which can in turn be part of buffer memory 240.

Image modulator 245 can be part of a CRT- or LCD-based direct view system, displaying images that can be in pixel format on display screen 260. However, if image modulator 245 is part of a projection system then image modulator 245 provides images to be projected and enlarged onto display screen 260. In a projector system, image modulator 245 is small (inches) and may be either a stationary or a movable element. To increase the apparent resolution of the displayed images, a reverse super-resolution technique in accordance with the invention adjusts the data values written into a stationary image modulator 245 at an increased frame rate. For a movable image modulator 245, the invention, preferably during each output frame in a cycle, moves image modulator 245 to effectively shift the display pixel matrix a fraction of a pixel in the X and Y directions, preferably at the screen refresh rate.

System 200 processes image data in a high-resolution internal format to preserve detailed image information because such information can be lost in each of the various image processing steps if the internal image format has lower resolution than the output of image modulator 245. System 200, for example, can assume that the processed image has four times (doubled vertically and horizontally) better pixel resolution than the (spatial resolution) output of image modulator 245.

Figure 3:
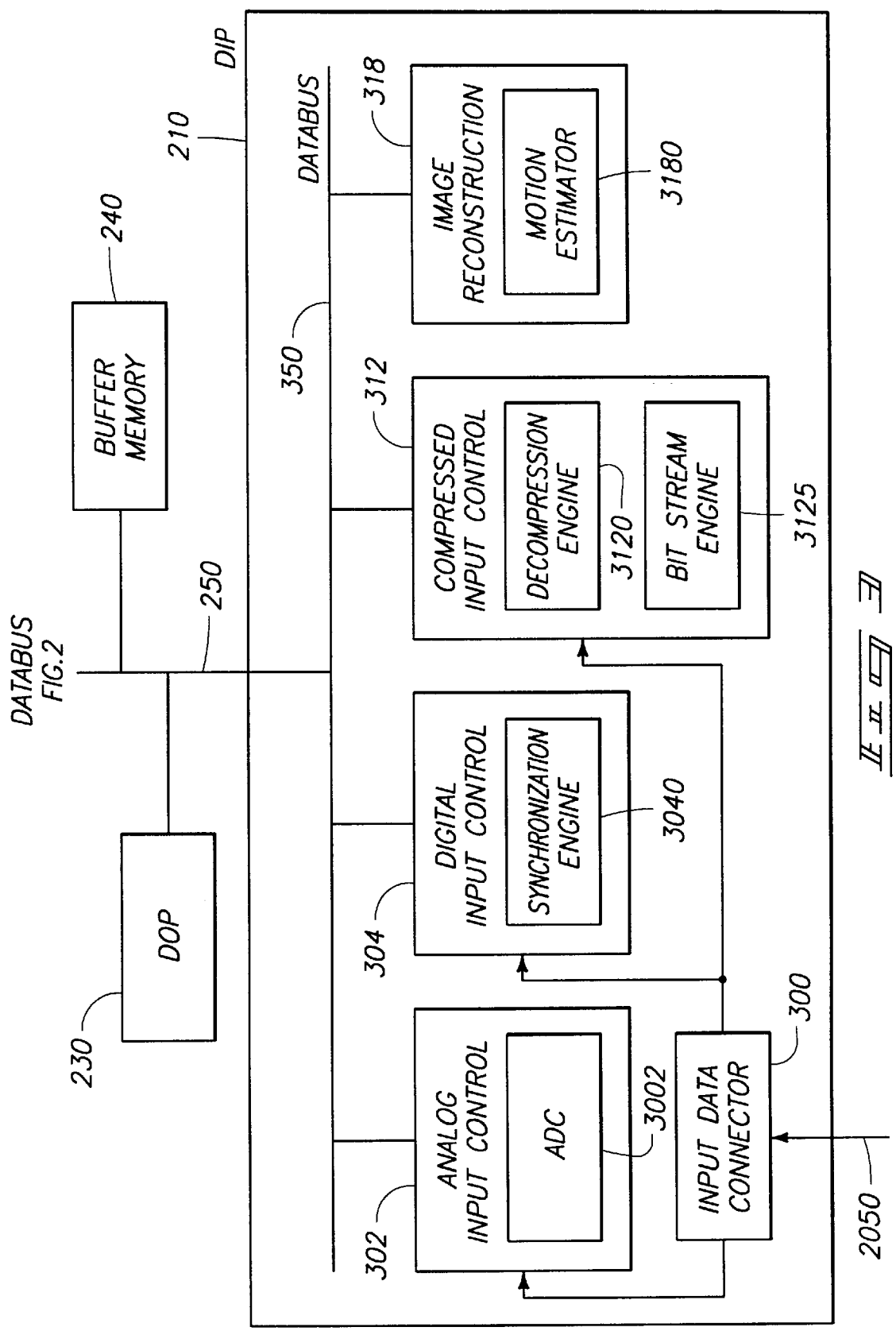
FIG. 3 is a block diagram of FIG. 2 DIP 210.

FIG. 3 is a block diagram of FIG. 2 DIP 210, including image processing modules Analog Input Control 302, Digital Input Control 304, Compressed Input Control 312, and Image Reconstruction (IR) 318, all connected to a databus 350. DIP 210 also includes one or more input data connectors 300 for receiving on line 2050 image data input to system 200, which can be one or more of analog video, digital video, non-tuned data, graphics data, or compressed data. Analog or digital video data may be in a native video format such as composite video, S-video, or some component YUV/YCrCb. Non-tuned data, receiving from a broadcast delivery system that may have many channels on a common carrier, may require a tuner (not shown) included in or separate from DIP 210 so that relevant data can be tuned from the channels. Compressed data may be in MPEG-2 format, which includes video and audio content, the data containing control or video overlay information for DOP 230. Image data on line 2050 may be encrypted for security and thus require decryption by DIP 210. Accompanying the image data, DIP 210 also receives control data including for example, selected inputs, data types, vertical blanking interval (VBI) data, overlay channel information for the on-screen display (OSD), etc., and provides this control data to DOP 230. Each of the image processing modules, Analog Input Control 302, Digital Input Control 304, and Compressed Input Control 312, preferably receives image data from connector 300. A system microcontroller (not shown) preferably uses user-selected input controls to select image data, which is appropriately processed by each of modules 302, 304, and 312, and then preferably stored in buffer memory 240. The system microcontroller also uses the user input commands to control windowing for picture-in-picture displays, OSD information, and other system windowing capabilities.

DIP 210 preferably processes images in RGB formats. However, if applicable, for example, when the UV vectors are the same as the Y vector, DIP 210 processes images in YUV formats. In this example DIP 210 requires three times less processing power and the saved power can be applied to per pixel processing.

Analog Input Control 302 preferably includes an analog-to-digital converter (ADC) 3002, which samples the analog data inputs and produces digital data outputs. ADC 3002, to achieve high quality, samples its input data frequently and precisely enough that the image can be reconstructed from the sampled data points. For example, if an analog input signal is Red, Green, and Blue having data for an 800×600 resolution screen that is being refreshed at 70 Hz, then the data rate for each channel is approximately 50 MHz. Consequently, ADC 3002, to properly sample the input for image reconstruction, runs at 100 MHz. ADC 3002 preferably uses Nyquist sampling to determine the appropriate sampling rate.

Digital Input Control 304 preferably includes a synchronization engine 3040 and processes digital data, which may be in a YUV video or a digital RBG format. Since the data is already in digital format, Digital Input Control 304 does not include an analog-to-digital converter. Digital Input Control 304 also uses high-speed digital data transmittal techniques that are described in the Institute of Electrical and Electronics Engineering (IEEE) standard 1394, Low Voltage Differential Signaling (LVDS), and Panel Link. These standards include line termination, voltage control, data formatting, phase lock loops (PLLs), and data recovery to assure that Digital Input Control 304 properly receives the digital data input.

Compressed Input Control 312, preferably including a decompression engine 3120 and a Bitstream Engine 3125, processes compressed data that usually includes audio, video, and system information. DIP 210, via Compressed Input Control 312, preferably receives compressed data because transmitting non-compressed high-speed digital data outside of system 200 (FIG. 2) is difficult and can be expensive in the cabling and component design. Further, current high speed digital interfaces are not fast enough to perform all of the panel-related processing in a separate system that requires a cable interface to a high resolution and high quality display system. Compressed Input Control 312, prior to decompression by decompression engine 3120, preferably demodulates the compressed digital data. Alternatively, a preprocessing system (not shown) may demodulate the data and provide it to Compressed Input Control 312. Compressed Input Control 312, performing additional steps such as error correction, assures that it properly receives the data and that the data is not corrupted. If the data is corrupted, Compressed Input Control 312 may conceal the corruption or request that the data be retransmitted. Compressed Input Control 312, once having correctly received the data, de-multiplexes the data into audio, video, and system streams, and provides the audio streams to an audio subsystem (not shown) for decoding and playback. Compressed Input Control 312 decompresses an encoded bitstream input, but retains relevant motion vector information for DOP 230 processing.

Bitstream Engine 3125 optimizes reconstruction of MPEG-2 input bitstreams into enhanced video frames in a manner that has not been used in prior art video enhancement products. The bitstream information includes side information such as picture and sequence header flags, which can be used as control data to optimize presentation for a particular display. Lower-layer coded data can reveal object shapes and other information that can be exploited to provide enhanced spatial and temporal rendering of blocks constituting images. Decompression engine 3120, its decoding engine (not shown), and IR 318 can use the bitstream information, for example, to better track, and thereby produce higher quality, moving objects.

Bitstream Engine 3125, to MPEG-2 encode an image frame, uses image blocks (or macroblocks). Since most video frames within a sequence are highly correlated, Bitstream Engine 3125 exploits this correlation to improve rendering. Bitstream Engine 3125 also employs motion estimation techniques for motion compensated prediction as a method of temporal processing across image frames. Bitstream Engine 3125 preferably uses a low-complexity and block-based prediction. Bitstream Engine 3125 can track the flow of video data prescribed by the prediction blocks belonging to the macroblocks within the bitstream, rather than re-estimating motion or creating the macroblocks similarly to a second pass encoding process. Bitstream Engine 3125 tracks the prediction blocks over several frames in which the temporal path of the prediction blocks delineates a coarse trajectory of moving objects. This coarse trajectory can be refined by additional motion estimation and bitstream processing. The motion vector of the prediction blocks includes a horizontal component and a vertical component. Bitstream Engine 3125 preserves the motion vector information for later use in generating DOP 230 output frames in conjunction with motion compensated temporal filtering and reverse super-resolution. The information can also be used for constructing a special block filter for post decompression filtering of the coded input stream so that IR 318 can filter artifacts of block boundary edges.

Buffer memory 240 receives data from Analog Input Control 302, Digital Input Control 304, and Compressed Input Control 312, and provides the data to Image Reconstruction 318. Buffer memory 240 also stores IR 318 output data.

IR 318 preferably includes a Motion Estimator 3180 and receives image data from Analog Input control 302, Digital Input Control 304, Compressed Input Control 312, or from buffer memory 240. IR 318 processes data based on data types. For example, if data in YUV format requires a conversion to the RGB domain, then IR 318, through either mathematics calculations or a look-up table, converts YUV values to RGB color space. However, IR 318 preferably processes image frames while they are still in the YUV color space and, if required, RGB color space conversion is performed during one of the last image processing steps by DOP 230. Additionally, YUV data is often sub-sampled, that is, one UV pair may correspond to two or four Y values. Consequently, IR 318 uses the UV values to interpolate and create RGB pixels. If YUV data is interlaced then IR 318 converts the data from field based (sequential half frames) to frame based. IR 318 stores each field in buffer memory 240, then filters, analyzes, and combines the fields to generate an input image frame. IR 318, if required, retransmits the processed input frames in analog video format. Nevertheless, IR 318 preferably uses the processed image frames and the motion information created by DIP 210 while the frames and the information are still in their digital format. If IR 318 processes data, such as overlay information, relevant to image modulator 245 (FIG. 2), IR 318 provides such data to DOP 230 to later be combined with the image data frames. IR 318 may process multiple input data streams in parallel and provide such data to DOP 230 to later produce a picture-in-picture display of multiple images. IR 318 also does post decompression filtering based on block boundary information included in the input bitstream.

IR 318 preferably uses techniques from, for example, Faroudja Labs and Snell & Willcox and Darim, that can sample and reconstruct input video, which includes composite, S-Video, and Component (Y, Cr, Cb) that may follow one of the industry standards such as Phase Alternative Line (PAL) or the National Television Standards Committee (NTS C). IR 318, to spatially filter for high quality image frames, preferably uses various techniques for noise reduction, such as recursive, median filter, and time base correction.

IR 318 takes account of multiple input images and then, to enhance the resolution of those images, uses super-resolution techniques that employ data shared by different input frames to restore an image, and thereby to produce each output frame. This cannot be done by independently using one input image at a time. The invention is thus advantageous over prior art systems which use super-resolution techniques for generating high-resolution still images from a video sequence, but not for generating output frames. The super-resolution techniques used by the invention depend on a high correlation of the data between frames, and require a sub-pixel shift of the input images, typically based on slight movements of objects in the images. IR 318, in correlating images to restore multiple frames, uses motion vectors provided by Motion Estimator 3180 or preserved from the input bitstream. IR 318, while generating still frames, can use mathematical equations from, for example, deterministic techniques of Projections On Convex Sets (POCS) and stochastic techniques of Bayesian enhancements.

When an image does not include MPEG-2 motion vector bitstream information, Motion Estimator 3180 preferably uses techniques such as optical flow, block matching, or Pel-recursion to estimate motion that tracks the image object motion in time. Motion Estimator 3180 can also use the same motion estimation techniques in conjunction with MPEG-2 motion vector bitstream information. Motion Estimator 3180 compares groups of pixels from one image field to those of subsequent and previous image fields to correlate object motion. Motion Estimator 3180 then records the detected motion relative to the field position so that DOP 230, together with input frame information and IR 318 motion information, can later generate motion-compensated image frames. For compression systems, Motion Estimator 3180 finds the best match between frames, then codes the mismatches as image "error terms." For motion compensation, Motion Estimator 3180 masks out motion vectors that do not meet a certain level of matching criteria, and tags the vectors that have a high level of matching so that these vectors can subsequently be used in more refined motion tracking operations, which are performed on smaller image blocks or on individual pixels. Motion Estimator 3180 thus differs from prior art techniques in which video compression systems use the detected motion as one of the steps to compress the number of bits needed to represent a video sequence. Consequently, the invention, via Motion Estimator 3180, advantageously provides better quality images than prior art techniques.

Because detecting motion is important in restoring images, Motion Estimator 3180 (and other processing modules according to the invention) tracks motion on a sub- (or smaller) block basis. For example, instead of on an 8×8 (pixels) block, Motion Estimator 3180 tracks motions on a 2×2 block, which tracks more refined motions. To reduce the need to track refined sub-blocks, Motion Estimator 3180 uses the image error terms to pre-qualify a block, and thus does not perform refined tracking on a block that has motion vectors with a high value for the error terms. Conversely, Motion Estimator 3180 does perform refined tracking on a block with a low value for the error terms.

When receiving motion estimation vectors, such as those provided in an MPEG-2 data stream, IR 318 stores them based on the magnitude of the image error terms. IR 318 then uses vectors with high error terms only in compliant MPEG-2 decoding, and vectors with low error terms both in compliant NPEG-2 decoding and in analyzing refined motions for restoring multiple frames. Analyzing refined motions can produce motion vectors for sub-block pixel sizes, which can be used in multiframe restoration to better produce high resolution output frames.

IR 318 preferably separates its output images into video fields or frames, and creates a pointer to the start of each field (or frame). Either the actual field (or frame) data or a pointer to the field (or frame) data may serve as inputs to DOP 230. Processing input video fields and producing frames that combine fields is useful for de-interlacing video in the image restoration process, which in turn is useful for increasing image resolution and for restoring the vertical detail that was lost during interlacing. IR 318 outputs (and DOP 230 outputs), having been reconstructed in accordance with the invention can have a higher resolution than can be supported by the number of pixels of image modulator 245. IR 318 outputs can be stored in buffer memory 240 or in a metafile that includes a description of the image both in a spatial RGB frame buffer format and in a semantic description of the image objects, textures, and motions.

Figure 4:
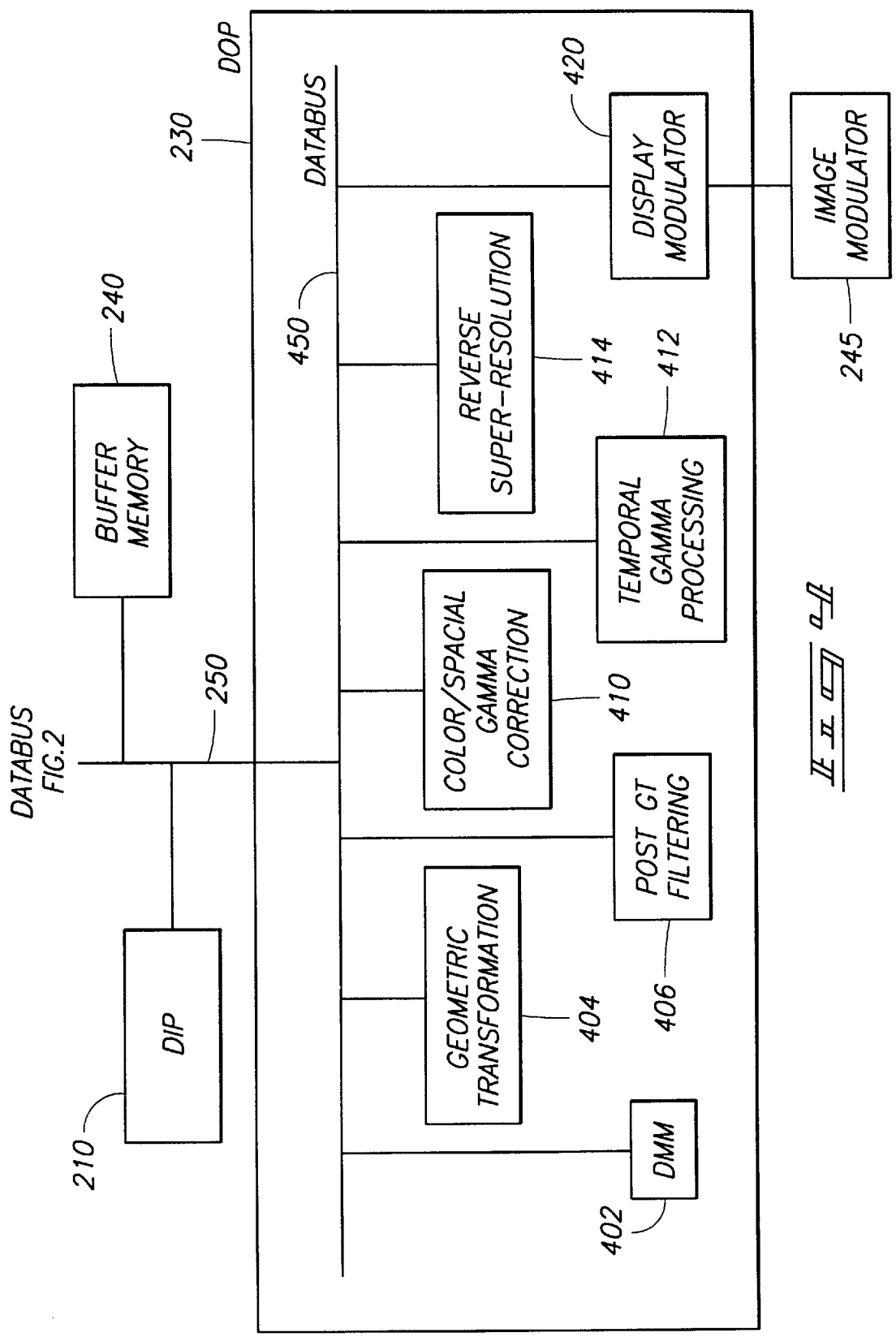
FIG. 4 is a block diagram of FIG. 2 DOP 230.

FIG. 4 is a block diagram of FIG. 2 DOP 230, which has a display map memory (DMM) 402 and image processing modules including Geometric Transformation 404, Post GT Filtering 406, Color/Spatial Gamma Correction 410, Temporal Gamma Processing (TGP) 412, Reverse Super-Resolution 414, and Display Modulation (DM) 420, all connected to a databus 450. Databus 450 satisfies system bandwidth and concurrency requirements for parallel image processing. DOP 230 also connects to buffer memory 240, which stores data frames for use by each of the processing modules 402, 404, 406, 410, 412, 414, and 420, although each of these modules may include a local memory buffer (not shown).

DOP 230 receives DIP 210 outputs either directly or via buffer memory 240. DOP 230 can use pointers (if applicable) to directly access DIP 210 output data. DOP 230 also receives multiple DIP 210 output images for performing picture-in-picture operations where a single image frame includes more than one processed input video frame. DOP 230 combines overlay data both from the input coded data and from any on-screen display (OSD) information such as a user menu selection provided by the system microcontroller. DOP 230 processes its input images and outputs image data including display coordination for both video and data output, and data and control signals for each R, G, and B image color component. Frame buffer 2400 (FIG. 2) can store DOP 230 outputs.

DMM 402 stores data corresponding to image modulator 245 (FIG. 2) characteristics at chosen pixel or screen locations. DMM 402, where applicable, also stores a memory description corresponding to each display pixel or a shared description of groups of display pixels or pixel sectors. Because the description does not change on a frame-by-frame basis, DMM 402 preferably reads the description only once during the display process. DOP 230 then uses the description information to generate image frames. DMM 402, when reading data, uses a set of control registers (not shown) that provide references to the data blocks.

DMM 402 data varies and includes, for illustrative purposes, manufacturing related information, system configuration information, and user data. Manufacturing related information includes, usually at assembly time, for example, a map of locations of defective or weak pixel display bits, correlation data of ideal radial imperfections and of optically distorted projection, and correlation data for alignment points for image modulator 245. System configuration information, through an automatic self-calibration, includes, for example, a registration map having adjustable intensity values for each R, G, and B color component and the color component pixel offset at given locations. DMM 402, where applicable, preferably uses sensor techniques, such as sonar range finding, infra red range finding, or laser range finding to measure distances from a projector (not shown) to different parts of display screen 260. DMM 402 then uses these measurements to mathematically characterize and model a projection display system. DMM 402 thus allows projecting images onto a mathematical approximation of a display screen 260 surface. User data includes user preference information such as brightness, color balance, and picture sharpness that are input by a user during a setup sequence. DMM 402 preferably provides data, either directly or through buffer memory 240, to Geometric Transformation module 404.

Geometric Transformation 404 redefines the spatial relationship between pixel points of an image to provide to frame buffer 2400 compensated digital images that, when displayed, exhibit the highest possible image quality. Geometric transformation, also referred to as warping, includes image scaling, rotation, and translation. Geometric Transformation 404 resamples data to produce an output image that can readily map onto FIG. 2 image modulator 245. However, the Geometric Transformation 404 output data points, due to scaling or resampling, may not correspond one-to-one data points the image modulator 245 grid. Consequently, DOP 230 includes Post Geometric Transform Filtering 406 to filter the transformed data samples from Geometric Transformation 404 and produce an output pixel value for each data point of image modulator 245. Post Geometric Transform Filtering 406 uses spatial filtering methods to smooth the image and to resample, and thus properly space, the data samples.

Geometric Transformation 404 also improves display image characteristics related to image modulator 245 and the display system. For image modulator 245 screen regions that have more image modulator 245 pixels than screen 260 pixels, Geometric Transformation 404 adjusts the pixel values by a spatial filtering to reduce differences in neighboring pixel values. Consequently, the corresponding image (stored in frame buffer 2400) is smooth and does not contain artifacts. For screen display regions that have fewer image modulator 245 pixels than screen 260 pixels, Geometric Transformation 404 uses edge enhancement filtering to increase differences between neighboring pixel values to pre-compensate for distortion that will be introduced when image projection spreads out neighboring pixels.

Geometric Transformation 404 preferably uses filtering algorithms, such as nearest neighbor, bilinear, cubic convolution, sync filters, or cubic spline interpolation, to process images and thus produce accurate interpolated image pixel values. Further, where multiframe restoration requires, Geometric Transformation 404 uses time varying multiframe filtering methods including deterministic techniques such as projection onto convex sets (POCS), and stochastic techniques such as Bayesian filtering. Based on the computation complexity, Geometric Transformation 404 chooses an appropriate filtering technique.

Geometric Transformation 404 can improve image deficiencies related to the screen 260 environment. Geometric Transformation 404 performs a spatial projection which warps the image to compensate for a curved display screen 260 as is usually used in front projection theater systems, and subsequently uses bitstream information to improve the image. For example, if it can acquire the depth of moving objects, Geometric Transformation 404 can reduce the distorted motions at the edges of a curved screen 260. Geometric Transformation 404 constructs an optical flow field of the moving objects along with the object distance information. Geometric Transformation 404 then uses motion adaptive filtering to construct a sequence of output frames that position the objects at the proper spatial coordinates in the time domain. Geometric Transformation 404 thus, during projection on a curved screen 260, conveys the proper motion of all objects in a scene. Geometric Transformation 404 also works in conjunction with an optical correction to improve distortions resulting from the different focal distances from a projector (not shown) to different parts of screen 260. Geometric Transformation 404 uses range finding techniques (discussed above) to construct a model of the screen 260 environment and then uses the information from the model and the optical system to mathematically construct a formula to compensate for image distortions. Geometric Transformation 404, to correct a warping distortion produced by an optical system, uses the same mathematical basis for a flat screen geometric transformation to apply to a curved screen.

Geometric Transformation 404 uses special processing, similar to the curved screen 260 processing, for various head-mounted displays (HMDs). A HMD is a display unit combined with a helmet or glasses that a user wears and usually includes two image modulators 245, one for the right eye and one for the left eye. HMDs are useful for a single viewer and, because of their physically smaller area, display high quality images.

Geometric Transformation 404, without considering motion adaptive filtering, treats image spatial projection with warping onto a curved screen 260 in the context of 3D graphics. Geometric Transformation 404 considers a display image frame as a 2D texture and considers a curved surface as a 3D surface. Geometric Transformation 404 then maps the 2D texture onto a surface that is the mathematical inverse of the curved screen 260. Geometric Transformation 404 thus pre-corrects the image frame so that, when projected, the mapped image will have filtered out the distortions associated with a curved screen 260. Geometric Transformation 404 preferably uses techniques such as anisotropic filtering to assure that the best texture is used in generating output pixels. Geometric Transformation 404 also preferably uses filtering techniques such as sync filters, Wiener deconvolution, and POCS, and/or other multipass filtering techniques to filter the images off-line and then output the filtered images onto a film recorder. Geometric Transformation 404 preferably allows more computationally intensive image operations to be performed off-line.

Geometric Transformation 404 processes video as 3D texture mapping, preferably using systems that accommodate multiple textures in images. For example, Geometric Transformation 404 can use high quality texturing techniques such as bump mapping and displacement mapping which apply multiple texture maps to an image. For another example, Geometric Transformation 404, modeling the graininess inherent in film, applies multi-surface texturing to give video a more film-like appearance. Geometric Transformation 404 can allow a user to select the graininess modeling feature as part of the setup procedure similarly to selecting room effects such as "Hall," "Stadium," etc., in an audio playback option.

Geometric Transformation 404 can process digital data from a multi-camera system to improve the focus, and thereby provide higher quality images for image modulator 245. Geometric Transformation 404 evaluates which of the multiple camera views provides the best focus for an object and then reconstructs the object in proper perspective. Geometric Transformation 404 then combines the multiple camera views on a regional or object basis to produce output images.

Geometric Transformation 404 can also use multi-camera bitstream information included in the image data to determine the object depth of a scene and to construct a 3D model of the shape and motion pattern of the moving objects. Geometric Transformation 404 then uses the same bitstream information to solve problems related to a curved screen 260 projection to achieve proper object motion completely across the screen 260.

Geometric Transformation 404 can also improve auto stereoscopic 3D display systems in which multiple camera channels present a binocular display and each of a viewer's eye sees a different monocular view of a scene. Geometric Transformation 404 can construct each of the monocular views in accordance with the focus and motion adaptive filtering techniques described above.

Color and Spatial Gamma Correction 410 converts YUV to RGB color space and determines the intensity values for each of the R, G, and B color components. Those skilled in the art will recognize that a color space conversion is not necessary if it has been done previously or if the image is otherwise already in the RGB color space. Color and Spatial Gamma Correction 410 preferably uses a look-up table, in which each of the R, G, and B color components has values corresponding to color intensities, to translate image colors. Each R, G, and B intensity value represents an index into the look-up table, and the table provides the output (or "translated") value. Color and Spatial Gamma Correction 410 independently processes each R, G, or B color component. Color and Spatial Gamma Correction 410 maps each color component based both on a combination of individual RGB values and on RGB values of surrounding pixels. For example, if FIG. 2 image modulator 245 requires a certain brightness for an identified area on display screen 260, then Color and Spatial Gamma Correction 410 may use the RGB values of the pixels in the identified area and of the pixels in the neighboring area. Color and Spatial Gamma Correction 410 uses mathematical calculations, or preferably a color look-up table (CLUT), to provide the RGB values for the desired image outputs. Color and Spatial Gamma Correction 410 prefers using a CLUT to mathematical calculations because a CLUT allows a non-linear mapping of the input RGB values to the translated (output) RGB values. A non-linear mapping enables input colors represented by RGB values to be adjusted (emphasized or de-emphasized) during the mapping process, which is useful for crosstalk suppression and for compensation of shortcomings in a color gamut of image modulator 245. Color and Spatial Gamma Correction 410, to realize a non-linear relationship, uses a translation table represented by a number of bits that is larger than the number of data input bits. For example, if eight bit represents 256 ($=2^8$) color component intensity values, then Color and Spatial Gamma Correction 410 uses, for another example, 10 bits to represent 1024 ($=2^{10}$) translated values. A system manufacturer maps 256 values to 1024 translated values.

TGP 412 assures that the time related representation of an image is as accurate as possible. TGP 412 thus, based on a previous frame value and a known transfer function of the display modulation system, adjusts its output values to provide a desired output value during a desired frame. TGP 412 independently processes each R, G, or B color component and compensates for modulating transition characteristics that, due to the nature of an LCD image modulator 245, are not purely digital. TGP 412 also overdrives the LCD image modulator 245 to compensate for the LCD material characteristics so that the desired output can be achieved more quickly. Consequently, TGP 412 overcomes the video quality limitation of prior art systems having materials that produce fast-motioned and blurred outputs. TGP 412 can also reduce the cost of the display system because the materials used for image modulation in prior art systems that provide faster image response are usually expensive. TGP 412 is described in detail with reference to FIGS. 6 and 7.

Reverse Super-Resolution (RSR) 414 performs a superset of the frame rate conversion process for converting between disparate input and output frame rates, and can improve display quality when intended display images have a higher apparent resolution than can be supported by the number of pixels of image modulator 245. RSR 414 simulates higher resolution outputs by sequencing lower resolution images at higher frame rates. Thus, for example, RSR 414, block by block, spatially filters one frame in a video sequence having a transfer rate of X frame per second (fps) to Y number of RSR frames having a transfer rate of Z fps, where $Z=X \times Y$. RSR 414 then shifts by the same pixel (or pixel fraction) amount the pixel matrix representing each RSR image block. For example, because there are Y RSR frames, RSR 414 shifts the pixel matrix block Y times, once for each RSR frame, and each shift is by the same pixel (or pixel fraction) amount. The number of pixel fractions to be shifted depends on the physical characteristics of the display system and of image modulator 245. Where a system adjusts the position of the viewed image, the shift fraction corresponds to the physical movement of the viewed displayed image. Where there is no actual movement of the displayed image, the fractional adjustment is based on the physical nature of the display device such as the pixel size relative to the size of image modulator 245 and to the projection characteristics of the system. RSR 414 then produces each RSR frame with a motion compensated weighted filtered center so that the center of the input image for each RSR frame is maintained such that no motion artifacts are introduced. A pixel matrix weighted filtered center is the center of a pixel matrix taking account of filter weights in a filter transfer function. Filter weights, varying depending on the filter characteristics, are the values (usually of multiplications and additions) which are combined with the input pixel values to produce the filtered image output. A filter transfer function uses filter weights to transform an input image to an output image. Output image pixels, based on a transfer function, can be adjusted to move the corresponding image. RSR 414 preferably uses image blocks having 8×8 to 256×256 pixels where each block has uniquely processed motion information. For static images, RSR 414 produces a sequence of frame-rate-adjusted output frames that are based on the difference between the input and the output frame rate. For motion pictures, RSR 414, at the time of the output frame, portrays the intermediate position of the image and compensates for the image motion. With increased processing, each pixel or sub pixel will have its motion information processed uniquely. RSR 414 is further illustrated with reference to FIGS. 8 and 9.

Display Modulator (DM) 420 preferably receives DOP 230 (processed) output data, and controls sending of that data to image modulator 245. DM 420, to prevent tearing within an image frame, may include control for timing updates with respect to the display timing. DM 420 outputs include separate data and control signals for each R, G, and B color component. For TFT displays that include column drivers, DM 420 outputs, for example, can be on one or two 24-bit digital busses that drive a raster scan. Alternatively, DM 420 may use voltage or frequency modulation techniques for outputs to drive image modulator 245. DM 420 outputs, for a flat panel display, include row and column drivers, and for each active matrix TFT, passive matrix LCD display, or other display type that requires them, includes voltage level specifications. Prior to modulating images, DM 420 determines the simplest way, the frequency, and the values represent the data to be written to image modulator 245. DM 420 uses TGP 412 and RSR 414, which include both compensation for the time response associated with image modulator 245 and an algorithm that increases the display update rate (or refresh rate), to increase the perceived resolution of image modulator 245. DM 420 stores in buffer memory 240 a copy of the previous data frame that was output to image modulator 245, and uses this previous frame data as a delta or "difference" buffer to reduce the amount of image updating performed by DM 420. DM 420 compares the new data and the previous frame data for a pixel, or a group of pixels, and if the new data is the same as the previous data, DM 420 does not update that pixel, or group of pixels.

Figure 5:
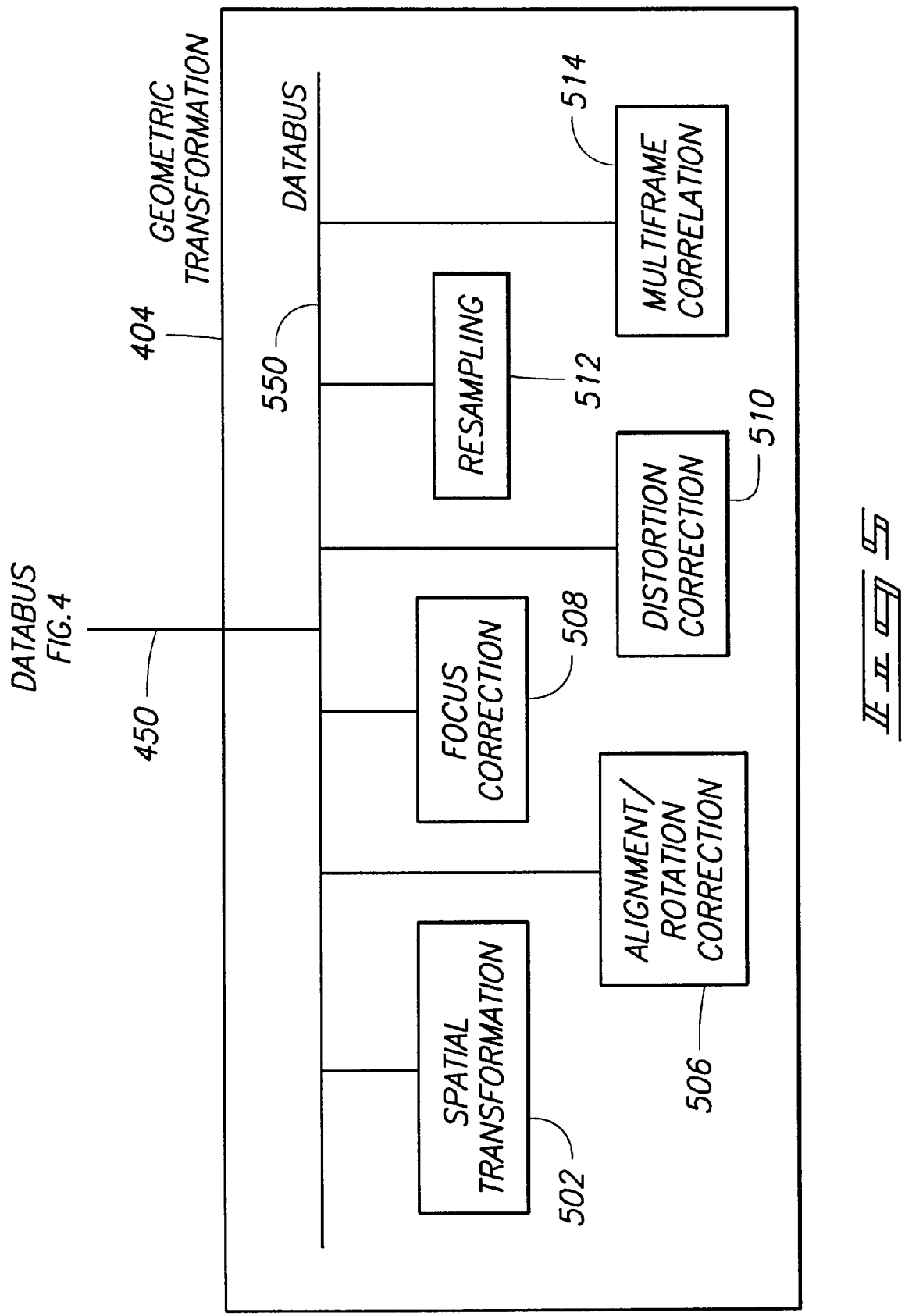
FIG. 5 is a block diagram of FIG. 4 Transformation 404.

FIG. 5 is block diagram of Geometric Transformation 404 of FIG. 4 and includes image processing modules Spatial Transformation 502, Alignment and Rotation Correction 506, Focus Correction 508, Distortion Correction 510, Resampling 512, and Multiframe Correlation 514, all interconnect via a databus 550. These processing modules, although they are shown as separate blocks, can be a single programmable processor performing the functions of the various module.

Spatial Transformation 502 redefines the spatial relationship between image pixel points. Spatial Transformation 502, for example, in an X-Y alignment in a projection system with three image modulators 245, allows each image modulator 245 to have extra pixel rows and columns. Spatial Transformation 502 then digitally adjusts the image pixels in the X-Y plane and writes the adjusted pixel data to image modulators 245. For example, if the pixel adjustment is by an integer, Spatial Transformation 502 shifts the old imaging pixel address by the integer number of pixels to adjust. However, if the adjustment is a non-integer then Spatial Transformation 502 resamples the image with a weighted filtering algorithm to acquire new pixel values. Spatial Transformation 502 also deals with image modulator 245 one-dimensional skew, tangential symmetry, aspect angle, and scale related distortions. Spatial Transformation 502 use resampling and weighted filtering algorithms to correct for such distortions on a pixel line by pixel line basis. Spatial Transformation 502 can perform texture mapping as in a traditional 3D rendering process.

Alignment/Rotation Correction 506 deals with image modulator 245 two dimensional skew, tangential symmetry, aspect angle, and scale related distortions. Alignment/Rotation Correction 506, for each R, G, and B color component, uses resampling and weighted filtering to reposition pixels in the both horizontal and vertical directions so that, when output, each color component is positioned in the proper locations across the entire image. Alignment/Rotation Correction 506 also repositions pixels to rotate display images. Alignment/Rotation Correction 506, to correct rotational misalignment for three image modulators 245 or geometric distortion from lenses, performs a geometric transformation to pre-compensate the images.

Focus Correction 508 improves non-uniform defocus, including defocus introduced by image modulator 245 optics. Focus Correction 508, to account for focus problems of display screen 260, preferably filters the image to pre-compensate the digital data representing the image. If a display screen 260 area has more image modulator 245 pixels than display screen 260 pixels, Focus Correction 508, on a single frame basis, uses noise filtering techniques to apply linear filters, nonlinear filters, and adaptive filters. Focus Correction 508 additionally uses techniques based on POCS or other adaptive filtering techniques to pre-compensate for anticipated focus blurring. In contrast, if the display screen 260 area has fewer image modulator 245 pixels than screen 260 pixels, Focus Correction 508 uses convolution techniques or reverse filtering techniques to perform edge enhancements to pre-compensate for the pixels being spread out and the image being blurred during projection. The spatial spread of the image due to the display system is characterized as the display system Point Spread Function (PSF).

Distortion Correction 510 corrects image distortion, including keystone effects. Distortion Correction 510 provides each image with a scan line having a different scale factor to precompensate for projection distance differences. Distortion Correction 510, starting from the upper portion of the image, filters the image, that is, permits the image to use fewer pixels on image modulator 245 so that, when projected, images on screen 260 will be proportioned properly.

Distortion Correction 510 also corrects for radial distortion introduced by lens systems. In regions where radial distortion increases the pixel density of display screen 260, Distortion Correction 510 uses a spatial filter to reduce any differences between neighboring pixel values. Consequently, the corresponding image is smooth and does not contain artifacts including high frequency artifacts. For screen display 260 regions that have fewer pixels than display screen 260 pixels, Distortion Correction 510 uses a filtering technique to perform edge enhancements which increase differences between neighboring pixel values. This pre-compensates for the PSF distortion which will be introduced during display where neighboring pixels are spread out. Consequently, the display process smooths out images that would have had sharp edges to have a more uniform appearance. Distortion Correction 510 preferably acquires specific distortion patterns from DMM 402.

Resampling 512 translates the pixel values from high resolution grids to new pixel values on image modulator 245 grids.

Multiframe Correlation 514 improves multiple frame display quality. For both increased and decreased pixel representations, Multiframe Correlation 514 uses algorithms such as Wiener deconvolution to exploit the temporal correlation between frames. Multiframe Correlation 514 uses multiframe techniques that process more than one input image frame to construct an optical flow field, which is further processed to construct output frames. IR 318 can provide frame inputs to Multiframe Correlation 514. Alternatively, these frame inputs may be part of the compressed data input to Compressed Input Control 312. Multiframe Correlation 514 can use Bayesian filtering or POCS techniques to extract multiple frame information and motion vectors showing relationships between frames from a compressed bitstream.

Multiframe Correlation 514 also converts an input frame rate to an output frame rate, for example, from 24 frames per second (fps) to 60 fps. Multiframe Correlation 514, thus, from the sequence of 24 input frames, generates 60 unique and distinct output frames wherein all moving objects are motion-compensated so that at the time when they are displayed, they are at the proper spatial coordinates. Information for generating proper output frames results from the input frame, motion estimation information, and object motion prediction. Motion estimation information is either part of the MPEG-2 input bitstream or generated by Motion Estimator 3180 during image input processing.

Figure 6:
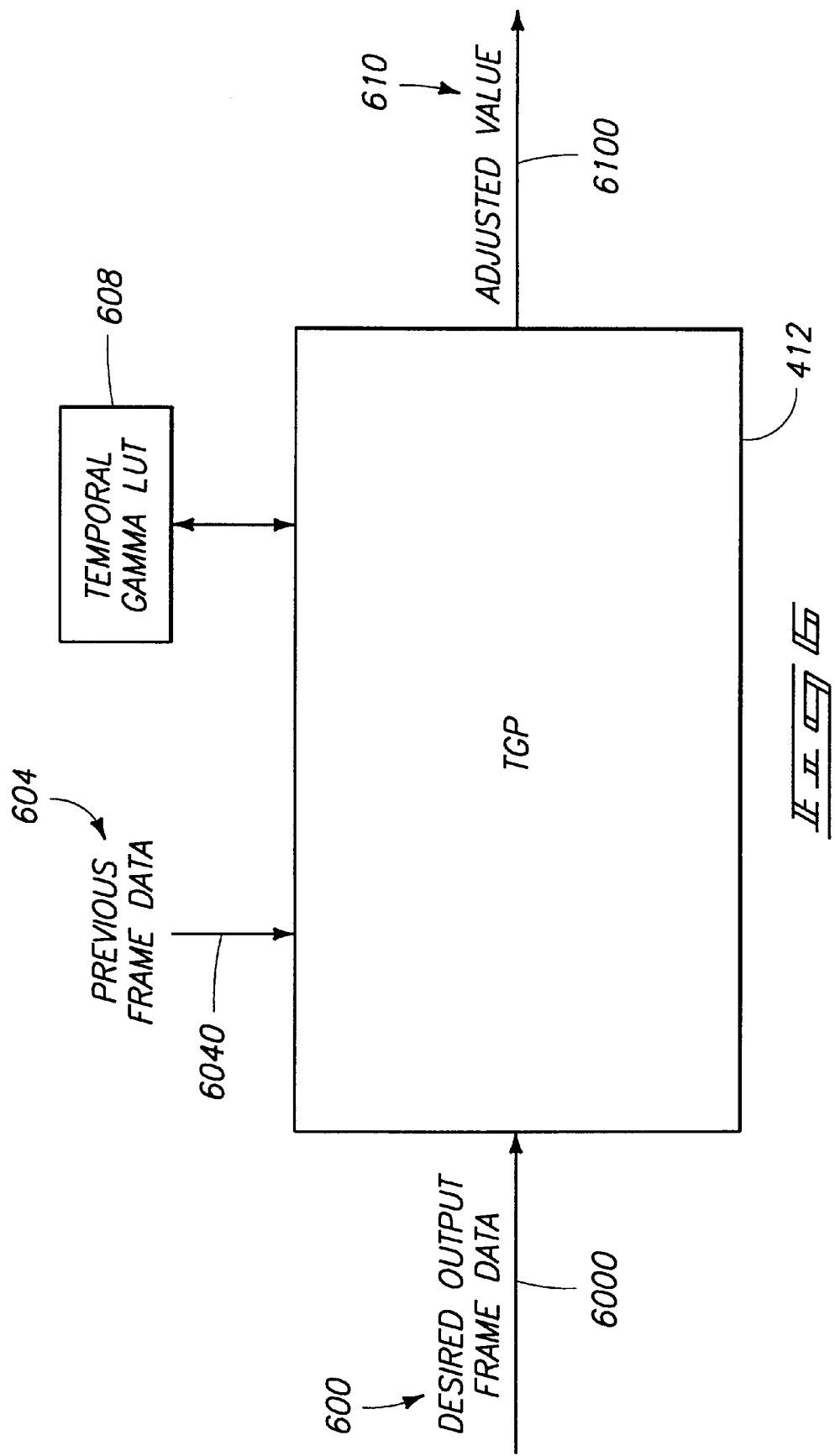
FIG. 6 illustrates the operation of FIG. 4 TGP 412.

FIG. 6 illustrates the operation of FIG. 4 TGP 412, which receives desired output frame data 600 on line 6000 and previous frame data 604 on line 6040, and outputs value 610 on line 6100. In the preferred embodiment, lines 6000, 6040 and 6100 are part of databus 450 (FIG. 4). Desired output frame data 600, previous frame data 604, and adjusted output value 610 are preferably in R, G, and B color component values. Desired output frame 600 preferably has been sampled by Resampling 512 (FIG. 5) and is provided from Geometric transformation 404, Post GT Filtering 406 and Color/Spatial Gamma Correction 410. Previous frame data 604 corresponds to the last frame data of desired output frame 600 that was output to image modulator 245. Previous frame data 604 is preferably stored in memory buffer 240 because previous frame data 604 cannot be efficiently read from image modulator 245, which does not provide a reliable or fast read path. TGP 412, processing each R, G, and B color component independently for each pixel, uses previous frame data 604 to select a look-up table in temporal gamma (TG) look-up table (TG LUT) 608, and from that selected table uses desired frame data 600 to provide adjusted value 610.

Figure 7:
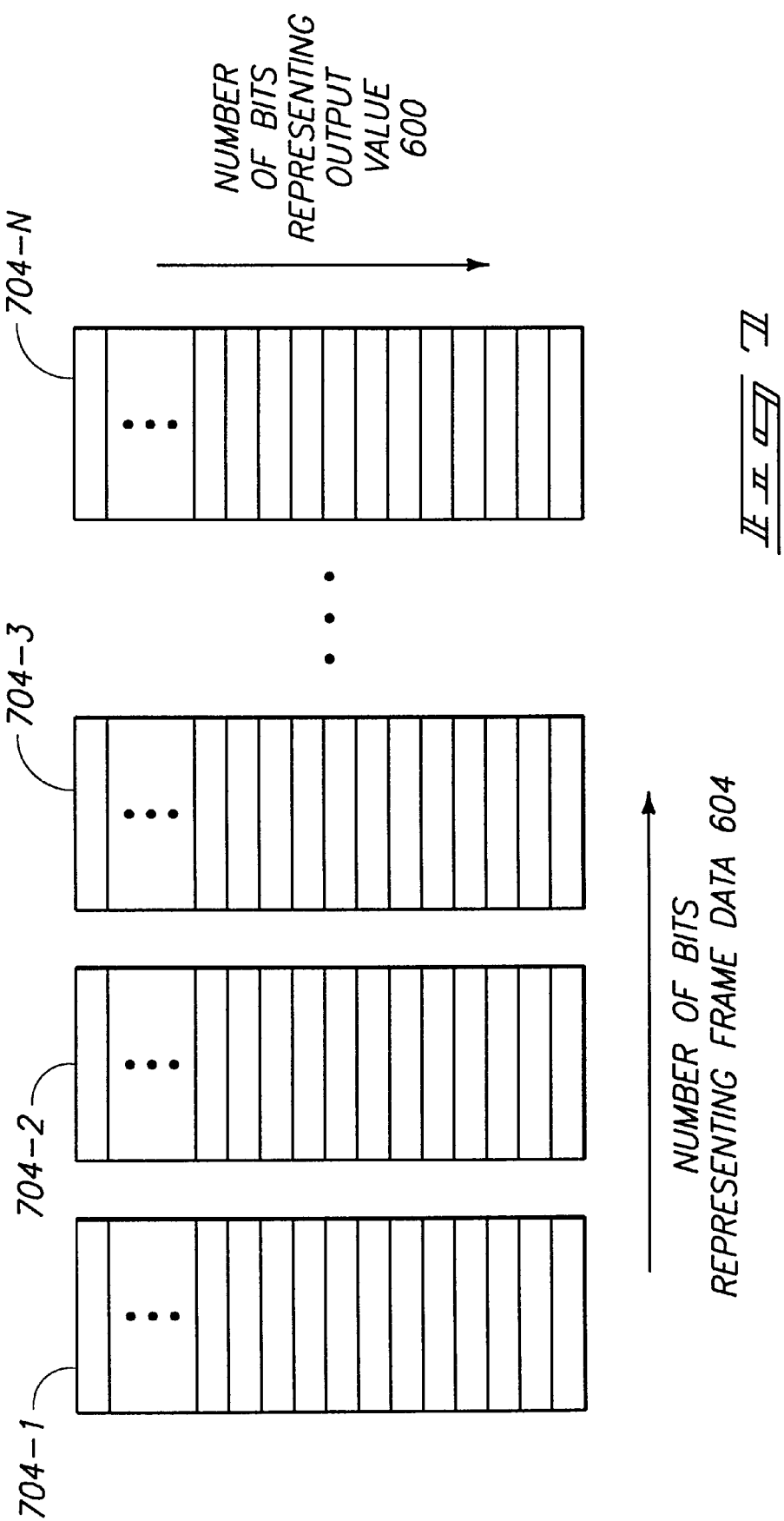
FIG. 7 illustrates the operation of FIG. 6 TG LUT 608.

FIG. 7 illustrates the operation of FIG. 6 TG LUT 608, which includes translation tables 704-1 to 704-N. The number of bits representing desired output value 600 determines the depth of a table 704, that is, the number of (Red, Green, or Blue) color component intensities a table 704 can store. The number of bits representing previous frame data 604 provides the number of tables 704. Consequently, if for example, 8 bits represent desired output data 600, then each table 704 can store 256 ($=2^8$) intensity values for each R, G, and B color component. Similarly, if another 8 bits represent previous frame data 604, then TGP 412 includes 256 tables 704 (from 704-1 to 704-256). However, TGP 412, when applicable, as when extensive mapping is not required, uses only the upper significant bits of previous frame data 604 to reduce the number of tables 704. For example, if previous frame data 604 uses only five most significant bits, then TGP 412 includes only 32 ($=2^5$) tables 704. TGP 412, when selecting a table 704, performs both the traditional spatial gamma correction and the temporal gamma correction.

The intensity value for each color component in each table 704 may contain more bits than the number of input data bits. For example 8 bits may represent 256 ($=2^8$) desired output values 600 while 10 bits represent 1024 ($=2^{10}$) look-up table entries in table 704. Consequently, a system manufacturer can provide a mapping table to map from 256 values to 1024 values. Alternatively, TGP 412 can use a formula or a transfer function in conjunction with a previous frame value 604 to determine the output value 610. For example, for a pixel at a location x in a pixel matrix, output value 610 J(x) may be determined by $$J(x)=L(x)+F(J(x)-K(x))$$

where L(x) is the desired output value 600, K(x) is previous frame data 604, and function F depends of the characteristics of image modulator 245 material.

Figure 9:
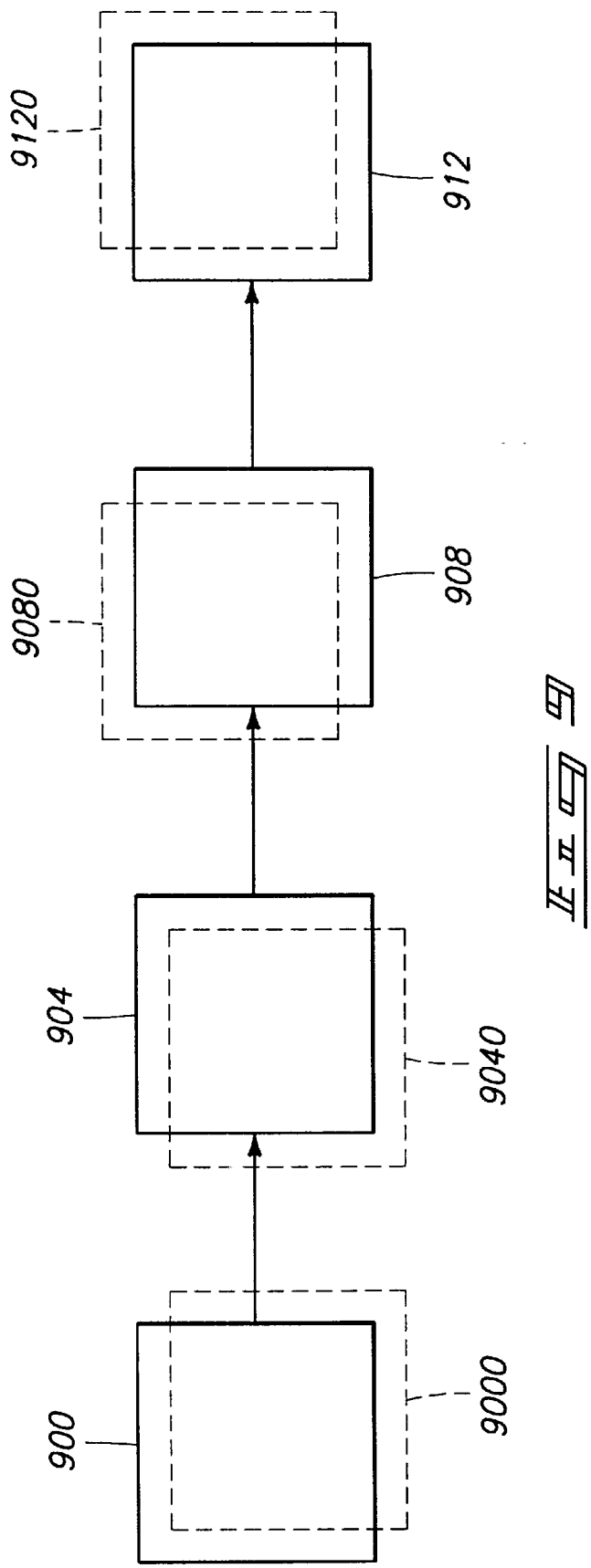
FIG. 9 illustrates reverse super-resolution operating on an image.

FIG. 8 and FIG. 9 illustrate the function of RSR 414 operating on a video sequence containing images that have a spatial resolution four times higher than can be supported by the number of pixels of image modulator 245. FIG. 8 shows, for example, a video image 800 having an 8×8 pixel resolution and image modulator 245 (FIG. 2) having a 4×4 pixel resolution. For illustrative purposes the video sequence transfer rate is 24 fps. RSR 414 filters 24 fps frames into 96 (4×24) fps images, and thus uses the higher spatial resolution at a higher temporal display rate, although each frame has a lower spatial resolution.

FIG. 9 shows an image frame 900 transitioned into frames 904, 908, and 912. However, to achieve a higher apparent resolution output image, RSR 414, block by block, spatially filters frames 900, 904, 908, and 912 into transitional frames 9000, 9040, 9080, and 9120, respectively. RSR 414, in generating frames 9000, 9040, 9080, and 9120, keeps the pixel matrix weighted filtered center of each frame 900, 904, 908, and 912 constant or such that motion artifacts are not generated. RSR 414 then filters frame 900 to frame 9000, that is, RSR 414 resamples each frame 900 block such that each frame 900 block output pixel matrix is shifted, for example, half a pixel to the bottom and half a pixel to the right. RSR 414 thus causes the effective center, or the weighted and spatially filtered center, of each pixel in a frame 900 block to shift to the center of what becomes the upper left quadrant of that pixel. Spatially filtering each block by block (versus filtering an entire frame at once) allows the filter coefficients to more accurately represent the desired block outputs. Combining the block outputs produces the new output frame. Further, spatially filtering each frame 900 to frame 9000 causes the viewable area of frame 9000 to be one pixel less on each edge than that of frame 900.

As frame 900 is transitioned to frame 904, RSR 414 filters frame 904 to frame 9040 (again on a block by block basis). Consequently, the frame 904 output pixel matrix is shifted half a pixel to the left and half a pixel to the bottom (the weighted center of each pixel shifts to that pixel's upper right quadrant). Similarly, as frame 904 is transitioned to frame 908, RSR 414 filters frame 908 to frame 9080, and as frame 908 is transitioned to frame 912, RSR 414 filters frame 912 to frame 9120. As a result, the frame 908 output pixel matrix is shifted half a pixel to the left and half a pixel to the top (the weighted center of each pixel shifts to that pixel's lower right quadrant), and the frame 912 output pixel matrix is shifted half a pixel to the right and half a pixel to the top (the weighted center of each pixel shifts to that pixel's lower left quadrant). RSR 414 can substitute any "pixel fraction" for "half a pixel" in the above discussion. The pixel fraction is determined by a system designer considering the projection path from image modulator 245 to display screen 260 and/or the pixel characteristics such as the grid spacing of the pixels versus the physical size of image modulator 245. In this preferred embodiment, shifting and filtering images and increasing the display rate produces higher resolution display images.

In a second embodiment, the invention, instead of just shifting the pixel matrix, can physically move the viewed images at the display screen refresh rate, by moving either the direct screen display device 260 or image modulator 245. Where the image modulator 245 is used in conjunction with a projector, the invention moves image modulator 245. The invention uses any of several techniques including Piezo electronics or micromachines to move modulator 245. For example, the invention uses Piezo electronics to vibrate image modulator 245, and thereby shifts modulator 245 in the X and Y directions. Assuming image modulator 245 and the pixel matrix representing an image are both square, Piezo electronics, according to the invention, uses the following equation to move image modulator 245:

$$D_m = D_d * (S/N)$$

where $D_m$ is the distance in inches to move image modulator 245, $D_d$ is the desired distance in a unit of a pixel size to move the image pixel matrix, S is the size in inches of an image modulator 245 side, and N is the number of pixels per side of the image pixel matrix. Consequently, if image modulator 245 is one inch per side and has 500 pixels per side, then Piezo electronics will move image modulator 245 by 0.0005 (=0.25*(1/500)) inch in order to move the display image one quarter (0.25) of a pixel. In this example, sequentially moving the display image a quarter of a pixel generates four times as many pixel locations. Further, sequentially displaying images at four times the refresh rate and shifting image modulator 245 by 0.0005 inch produces a four times greater resolution for the display images. This increased resolution results from the four-times increase in the display rate, the generation of images transferred to image modulator 245, and the shifting of image modulator 245. Image modulator 245, while being moved to shift an image pixel matrix, uses data in the four frames 900, 904, 908, and 912 to sample pixels for each image location of an output image, and from the four corresponding locations from the four frames 900, 904, 908, and 912, produces one location to display. Moving image 245 is in repeated cycles. Further, during each cycle, image modulator 245 uses a corresponding sample from each of the four frames 900, 904, 908, and 912.

Alternatively, the invention can use other techniques that allow the illusion of moving modulator 245 without physically moving any parts. For example, the invention can use more than one LCD mirror to reflect the image through the display projection system where each mirror has a slightly different projection angle. The invention uses the LCD mirrors to create a sequence of projected images with slightly different positions. The invention can also use lenticular lens, LCD mirror, or multi-layered micro display technologies to move the viewed image without moving image modulator 245. In accordance with the invention, RSR 414 produces, for static images, an output which is stable to a viewer because human vision interpolates multiple images to form one continuous image view.

However, for moving images, RSR 414 outputs would contain unwanted motion artifacts. Consequently, to prevent these artifacts, RSR 414 uses motion-adaptive filters, including median filters, that include motion tracking to filter each block constituting each image frame (900, 904, etc.). Motion-adaptive filtering accounts for positions of moving objects between intermediate frames created by RSR 414. For example, an object may be moving along an X axis from a position 6 in a frame i to a position 10 in a frame k. If RSR 414 creates an intermediate frame j, then the moving object will be positioned at location 8 in frame j, which is half way between location 6 in frame i and location 10 in frame k. Similarly, if three intermediate frames j1, j2, and j3 were produced, the object would be positioned at locations 7, 8, and 9 in frames j1, j2, and j3, respectively. RSR 414, used in combination with motion-adaptive filtering, weights the RSR frames and compensates for motions between frames.

RSR 414 also uses the block-based motion estimation from the MPEG-2 motion vectors or from Motion Estimator 3180 to track motion in the image. RSR 414 first identifies the motion blocks of the objects within an image, then allows successive output frames to utilize the image object motion information and to move the center weighting for the corresponding pixels to correlate to the object motion. RSR 414 also uses multiple input frames or fields to track the trajectory and velocity of moving objects and thereby predicts the object spatial position in a frame. As a result, RSR 414 greatly reduces or even eliminates motion artifacts. RSR 414 thus can produce images having higher resolution than can be supported by the number of pixels of image modulator 245, and provide a high resolution system without incurring increased cost as is usually found in prior art high resolution systems.

When compressed bitstream data is received, RSR 414 can extract the motion tracking information directly from the bitstream, which preferably includes the data to discern which blocks contain moving objects and the object movement patterns. Alternatively, RSR 414 can extract the same motion tracking information from post-decoded (or decompressed) frames. RSR 414 then provides the motion tracking information to the filtering algorithms.

RSR 414 can improve FEDs and the class of displays defined as those in which each pixel is made up of a matrix of emitting elements. For example, RSR 414 combines the FED mesh cell configuration and its address control to perform RSR and, from high resolution images, sequences a high resolution output using a FED that has a lower number of addressable pixels. RSR 414 uses the same techniques for generating the spatially filtered RSR frames to determine the sequence of lower resolution images. RSR 414 then, taking advantage of the sub-pixel addressing within a pixel that is unique to the microtips and mesh structure of the FED, writes the sequence of the frames within the FED sub pixel addressing. The resolution of FEDs is defined as the ability to individually address a pixel. According to the invention, FEDs can be designed with an internal function to adjust the mesh cell emitter positions for data already stored in the pixels. In this way the position of the image is moved without a new image being loaded into the pixels. Sequentially modulating images within the FED mesh structure constructs a display image that has higher resolution than the addressable resolution of the FED display would otherwise allow.

Figure 10:
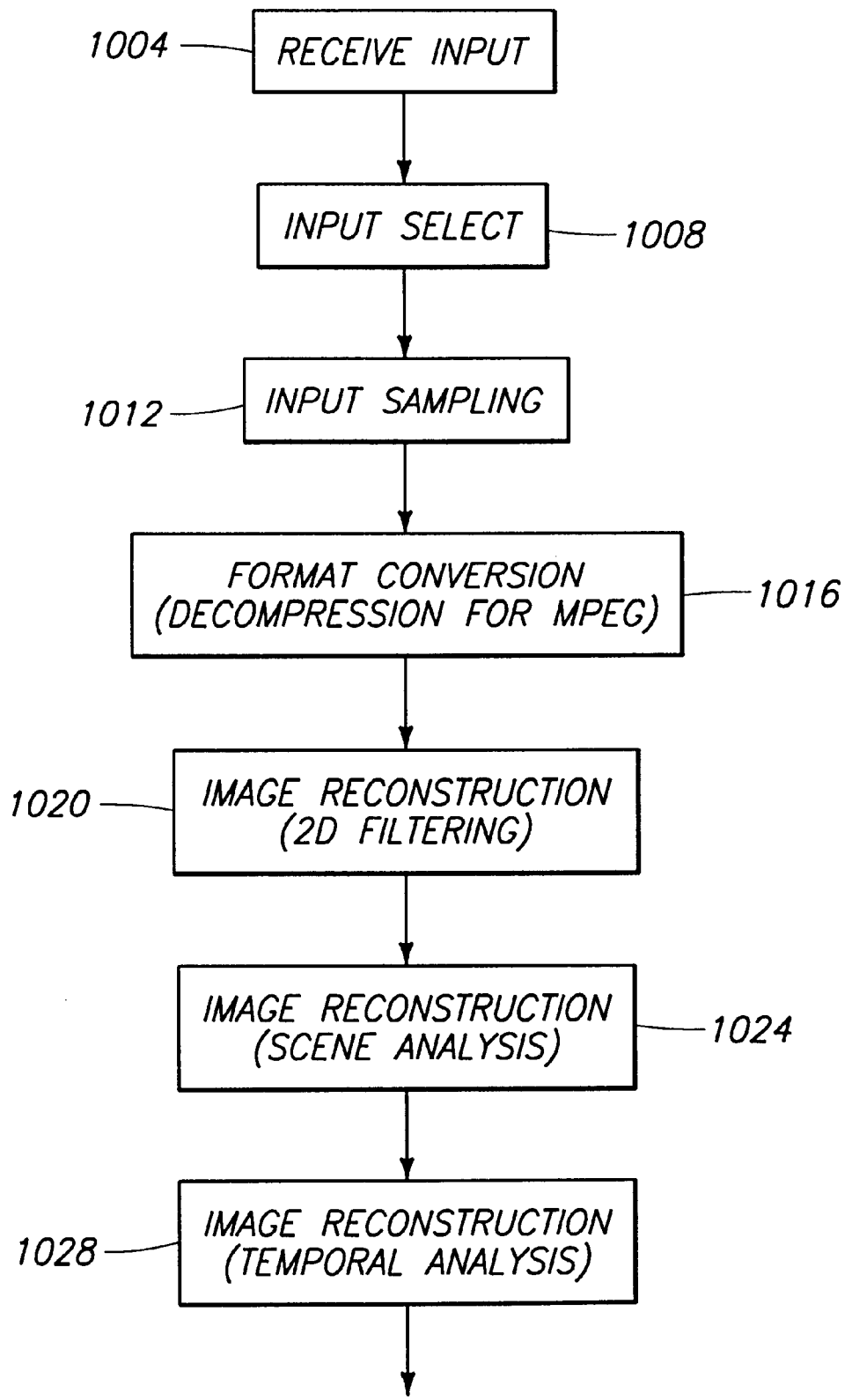
FIG. 10 is a flowchart illustrating DIP 210's image processing.

FIG. 10 is a flowchart illustrating DIP 210's image processing steps in selecting and reconstructing images. In these steps, DIP 210, where applicable, preferably creates a database to store motion information for later use by DOP 230. In step 1004, system 200, via connector 300 of DIP 210, receives input images. In step 1008, a microcontroller preferably selects one or more input images and provides each image to appropriate image processing modules Analog Input Control 302, Digital Input Control 304, and Compressed Input Control 312. Each processing module 302, 304, and 312 in step 1012 samples, and thereby recovers, the input images. Analog Input Control 302 may discard unnecessary or repeated input fields.

Compressed Input Control 312, via Bitstream Engine 3125, analyzes the compressed input streams and selects one or more picture streams for analysis and processing. For quality picture display, Bitstream Engine 3125 records the motion information from the bitstream for use in the image reconstruction steps 1020, 1024, and 1028, and by the DOP 230. Bitstream Engine 3125, based on a quality trade-off decision, can select a single picture or decode multiple pictures. This is because system 200 may not have the compute power required to process multiple input streams at full quality. If multiple pictures are to be displayed simultaneously, each picture will only be a portion of the total display output and thus can cause lower visual display quality than if a single picture were used for the full output. Bitstream Engine 3125, while sampling a compressed stream, may extract multiple picture streams, and, if required, reduce the complexity of the multiple picture streams to be processed.

In step 1016 each processing module 302, 304, and 312 preferably formats the images and stores them in buffer 240. In this step 1016 Decompression Engine 3120 preferably uses the MPEG-2 decompression steps to convert the compressed bitstream into a decompressed and decoded picture. Decompression Engine 3120 can simultaneously decompress more than one compressed picture stream for multiple picture displays including advanced picture-in-picture displays and multi-camera systems. For input data that includes layered coding information, where there is a base layer and an enhancement layer of coded information, Decompression Engine 3120 can decode both layers for use by the Image Reconstruction 318.

Image Reconstruction 318 in step 1020 spatially filters each image frame to reconstruct 2D images. Spatial filtering includes various techniques for noise reduction so that the filtered image does not include artifacts that were not part of the original image. Filtering is preferably applied across the entire input image based on the data values. However, filtering can use additional information, such as spatial position of the decoded macroblocks, that is provided by the Bitstream Engine 3125 in cases where, for example, the MPEG-2 data has been decompressed by Decompression Engine 3120. This positional information allows the filter to reduce or eliminate artifacts from boundary edges from the decoded macroblocks while performing the more traditional spatial filtering on the other portions of the image.

In step 1024 Image Reconstruction 318 performs scene analysis on each of the spatially filtered input images. For input images that were not MPEG-2 data, Image Reconstruction 318 analyzes and arranges the scene data as groups of pixels for use by the Motion Estimator 3180. For MPEG-2 data, Image Reconstruction 318 can combine the motion vector information, which is usually block based, with the decoded and filtered images to recognize image objects. Image Reconstruction 318 can apply a filter, such as a sharpening convolution filter, to enhance the image edges. Image Reconstruction 318, via the enhancement filtering that uses information from the Bitstream Engine 3125, can enhance input image details without amplifying the compression artifacts.

Image Reconstruction 318 in step 1028 performs temporal analysis, which utilizes multiple scenes to filter the images and to record the object motion information, then performs a super-resolution multiframe restoration. For input data that was interlaced, Image Reconstruction 318 de-interlaces the input fields. Image Reconstruction 318, using temporal analysis, performs median filtering and reconstructs the spatial resolution of each image based on the information from the neighboring images. Image Reconstruction 318 uses Motion Estimator 3180 to estimate the motion information for objects that were detected during the scene analysis in step 1024.

Image Reconstruction 318 in steps 1020, 1024, and 1028 can utilize additional information from an input stream such as a layered coding including picture-layer flags and coded information for object shape information.

FIG. 11 is a flowchart illustrating DOP 230's image processing steps. DOP 230 in step 1104 receives DIP 210 outputs which include both the spatially enhanced image and supplemental information that includes, for example, motion information, other object or block based information, sensor information, or multi-camera view information, and other information about the images. In step 1108, DOP 230 combines DIP 210 outputs with the display system information to perform image geometric transformation including spatial transformation, alignment/rotation, focus, and distortion correction. Geometric transformation can improve display deficiencies related to the display environment, such as introduced by image modulator 245, display screen 260, and display system optics 120. Geometric transformation can also produce enhanced output images that correct for special environments such as head-mounted, panoramic, and stereoscopic display systems. The spatial filtering techniques of Geometric Transformation 404 can use traditional real-time 3D graphics techniques such as texture mapping to achieve the desired image manipulations.

DOP 230 in step 1108, via Multiframe Correlation 514, increases the spatial resolution of the transformed output frames. Multiframe Correlation 514 uses motion vector information, either alone, or in combination with the original bitstream input, a Bitstream Engine 3125 enhanced version of the original bitstream, or the Motion Estimator 3180. Combining the spatial and temporal processing that utilizes the information of multi frames (versus just one frame) allows increasing the image output resolution, which, along with other steps, allows the image output resolution to be higher than the input resolution.

DOP 230 in step 1112 performs frame rate conversion (FRC), which also uses the motion vector information in motion compensated filtering. FRC is usually required where the input frame rate is different than the output frame rate. For highest visual display quality, FRC uses both the transformed image data and the supplemental information, such as motion vector information, to produce a unique set of motion compensated output frames. These unique output frames temporally adjust the output images to produce smooth and accurate motion portrayal. For example, DOP 230 can use motion vector information to produce an output image where an object that changes location from one input frame to the next is shown to be fractionally between the two locations for the output frame. DOP 230 also uses motion compensated filtering for the special display environments such as a panoramic system where the motion portrayal needs to correct for the non-uniform nature of having a curved display screen 260.

In step 1116, DOP 230, via RSR 414, performs image RSR, which is a special case of FRC where the output frame sequencing is not only for motion portrayal, but also for increasing the apparent spatial resolution of the display. RSR is particularly applicable to display systems where image modulator 245 supports a high refresh rate. RSR 414 may perform system frame rate conversion. Alternatively, Multiframe Correlation 514 of Geometric Transformation 404 may generate the RSR frames. RSR produces the highest image quality when the motion compensated filtering is carefully matched to small block sizes or to individual pixels. Like Multiframe Correlation 514 and FRC, RSR 414 utilizes motion vectors for generating output frames.

In step 1120 DOP 230 uses Color/Spatial Gamma Correction 410 and Temporal Gamma Processing 412 to perform gamma correction both spatially and temporally. Gamma correction translates each display pixel and assures that the display system achieves the full color gamut. Gamma correction preferably uses gamma correction tables loaded during system configuration.

In step 1124 DOP 230 uses Display Modulator 420 to control the sending of display images to image modulator 245. For special displays that contain multiple simultaneous images, such as a panoramic or stereoscopic display system, Display Modulator 420 may sequence or control the output of more than one output image.

DOP 230 in steps 1112, 1116, 1120, and 1124 takes account of manufacturing defects, calibration data, environment effects, and user controlled setup information. Each processing step 1112, 1116, 1120, and 1124 can also support multiple simultaneous images that are used for a multiple window display or advanced picture-in-picture display. Additional display output information such as on-screen display and overlay information is also merged into the display stream such that it becomes part of the output image.

DOP 230 in step 1128 sends display images and control information to a digital memory or image modulator 245, which provides images to display screen 260, either directly or through a projector. By combining DOP 230 and image modulator 245 in a tightly coupled system, precise control of the output image can be achieved to produce very high quality display images.

The invention has been explained above with reference to two preferred embodiments. Other embodiments will be apparent to those skilled in the art in light of this disclosure. For example, system 200 of the invention can be implemented in either hardware or software or some combination of fixed function, configurable logic or programmable hardware. These and other variations upon the preferred embodiment are intended to be covered by the appended claims.

What is claimed is:

1. An image processing apparatus for processing bitstream information to provide the video stream image data for use in a display system having a display device, comprising:
   a databus;
   a display input processor (DIP) coupled to said databus, said DIP comprising a data input connector and a first plurality of processing modules configured to receive said bitstream data through said data input connector and generate DIP outputs therefrom;
   a display output processor (DOP) coupled to said databus, said DOP comprising a second plurality of processing modules configured to process said DIP outputs and provide DOP outputs therefrom, said second plurality comprising a temporal gamma processing (TGP) module; and
   a buffer memory, coupled to said databus, configured for storing said DIP outputs and said DOP outputs and for providing stored DOP outputs as video stream image data to said display device.

2. The apparatus of claim 1 wherein said temporal gamma processing module is configured to use a desired intensity value and a previous frame intensity value to determine an output intensity value for each color component of said DIP inputs.

3. The apparatus of claim 2 further comprising a plurality of look-up tables, the plurality configured such that said desired intensity value determines the depth of said look-up tables and said previous frame intensity value determines the number of look-up tables.

4. The apparatus of claim 3 wherein said temporal gamma processing module is configured to use at least one of said look-up tables for performing color gamma correction.

5. The apparatus of claim 3 where in s aid temporal gamma processing module is configured to use a formula for determining the values of said DOP outputs.

6. An image processing apparatus for processing bitstream information to provide video stream image data for use in a display system having a display device, comprising:
   a databus;
   a display input processor (DIP) coupled to said databus, said DIP comprising a data input connector and a first plurality of processing modules configured to receive said bitstream data through said data input connector and generate DIP outputs therefrom;
   a display output processor (DOP) coupled to said databus, said DOP comprising a second plurality of processing modules configured to process said DIP outputs and provide DOP outputs therefrom, said second plurality comprising a reverse super-resolution (RSR) module; and
   a buffer memory, coupled to said databus, configured for storing said DIP outputs and said DOP outputs and for providing stored DOP outputs as the video stream image data to said display device.

7. The apparatus of claim 6 wherein said second plurality of processing modules further comprises a display modulator, said display modulator configured to provide modulated data to an image modulator for forming display images on said display device, said image modulator configured for a specific display device.

8. The apparatus of claim 7 wherein said RSR module is configured to improve display images that have a higher spatial resolution than can be supported by the number of pixels being modulated.

9. The apparatus of claim 8 wherein each pixel of said display modulator comprises a matrix of emitting elements modulating said display images.

10. The apparatus of claim 9 wherein said matrix of emitting elements adjusts the position of image outputs during multiple output frames without reloading pixels.

11. The apparatus of claim 8 wherein said first plurality of processing modules comprises an image reconstruction (IR) module.

12. The apparatus of claim 11 wherein said IR module is configured for providing an output frame having resolution higher than an input frame.

13. The apparatus of claim 12 wherein said IR module is further configured to use an input frame to construct intermediate frames having resolution higher than the input frame and to use motion estimation vectors to correlate the intermediate frames adjacent frames and restoring said input frames from said intermediate frames.

14. The apparatus of claim 13 wherein said IR module is configured to tag said motion estimation vectors with image error terms based on an image matching criteria.

15. The apparatus of claim 14 wherein said IR module is configured to restore said input frames from said intermediate frames using motion estimation vectors having a low value for said image error terms.

16. The apparatus of claim 14 wherein said IR module is configured to use input frames configured as pixel blocks having sub-blocks, and is further configured to track motion of said input frames on a sub-block basis if said motion estimation vectors are tagged with a low value for said error terms.

17. The apparatus of claim 14 wherein said IR module is configured to use motion estimation vectors from an input bitstream.

18. The apparatus of claim 7 wherein the data modulated by said display modulator is pixel data for forming display images on said display device.

19. The apparatus of claim 6 wherein said RSR module is further configured to receive said video frequency or image data as a sequence of input frames having a transfer rate of X frames per second and to RSR filter each input frame of said sequence of input frames and to provide therefrom a sequence of Y number of RSR frames having a transfer rate of Z frames per second where Z=X*Y, and wherein the Y number of RSR frames comprise a start RSR frame and at least one subsequent RSR frame.

20. A method for processing bitstream information to form images for use in a display system having a display device, comprising:

receiving said bitstream information into a display processor (DIP);

processing said received bitstream information to generate DIP outputs;

receiving said DIP outputs into a display output processor (DOP);

processing said DIP outputs with a temporal gamma processing (TGP) module to generate DOP outputs;

directing said DOP outputs to a buffer memory module; and providing images based on said DOP outputs to said display device.

21. The method of claim 20 wherein processing with said TGP module comprises determining a output intensity value for each color component of said DIP outputs.

22. The method of claim 21, wherein determining said output intensity value comprises using a desired intensity value and a previous frame intensity value to determine said output intensity value for each color component of said DIP outputs, wherein the using comprises looking up a value within a plurality of look-up tables, the depth of said plurality of look-up tables being a function of the desired intensity value and the number of tables with the plurality being a function of the previous frame intensity.

23. The method of claim 22 wherein processing with said TGP module comprises using a formula for determining an output intensity value for each color component of said DIP outputs.

24. The method of claim 21 wherein processing said DIP outputs further comprises processing the outputs with a reverse super-resolution (RSR) module and a display modulator (DM) module.

25. A method for processing bitstream information to form images for use in a display system having a display device, comprising:

receiving said bitstream information into a display processor (DIP);

processing said received bitstream information to generate DIP outputs;

receiving said DIP outputs into a display output processor (DOP), said DOP comprising a reverse super-resolution (RSR) module and a display modulator (DM) module;

processing said DIP outputs with said reverse super-resolution (RSR) module and said display modulator (DM) module;

directing said DOP outputs to a buffer memory module; and providing images based on said DOP outputs to said display device.

26. The method of claim 25 wherein processing said DIP outputs with said RSR module comprises sequencing frames of low resolution data having a first transfer rate, input frames, and converting the each input frame into a number of RSR frames having a second transfer rate higher than the first rate, the number of RSR frames representing an RSR image block having a simulated higher resolution.

27. The method of claim 26 wherein the second transfer rate is equal to the product of the first transfer rate and the number of RSR frames.

28. The method of claim 25 wherein processing said DIP outputs with said RSR module to form RSR frames further comprises shifting a pixel matrix that represents each RSR image block by the same pixel amount, where the pixel amount can be either a number of pixels or a pixel fraction.

29. The method of claim 28 wherein shifting said pixel matrix comprises shifting such that a matrix pixel weighted center of each input frame is constant for each of the number of RSR frames formed from the input frame.

30. A method for temporal gamma processing, comprising:

providing a first color intensity value;

providing a second color intensity value;

providing a number of look-up tables, each table comprising a number of adjusted color intensity values, wherein the number of tables, L, is a function of the second color intensity value and the number of adjusted color intensity values, M, is a function of the first color intensity value,;

using the second intensity value to select one of said tables; and using said first color intensity value to select one of said adjusted color intensity values in said selected table.

31. The method of claim 30 wherein said first color intensity value comprises a desired output frame color intensity value and said second color intensity value comprises a previous frame color intensity value which corresponds to a previous value of said desired output frame color intensity value.

32. The method of claim 30 wherein each of said tables further comprises mapping values.

* * * * *